United States Patent
Lim et al.

(10) Patent No.: US 10,404,774 B2
(45) Date of Patent: Sep. 3, 2019

(54) MOBILE DEVICE AND METHOD FOR CONTROLLING TRANSMISSION TO WEB SERVER IN MOBILE DEVICE

(71) Applicants: Samsung Electronics Co., Ltd., Gyeonggi-do (KR); University-Industry Cooperation Group of Kyung Hee University, Gyeonggi-do (KR)

(72) Inventors: Hanna Lim, Seoul (KR); Sungwon Lee, Gyeonggi-do (KR); Jicheol Lee, Gyeonggi-do (KR); Hyungho Lee, Seoul (KR)

(73) Assignees: Samsung Electronics Co., Ltd., Suwon-si (KR); University-Industry Cooperation Group of Kyung Hee University, Yongin-si (KR)

( * ) Notice: Subject to any disclaimer, the term of this patent is extended or adjusted under 35 U.S.C. 154(b) by 147 days.

(21) Appl. No.: 14/321,704

(22) Filed: Jul. 1, 2014

(65) Prior Publication Data
US 2015/0006681 A1     Jan. 1, 2015

(30) Foreign Application Priority Data
Jul. 1, 2013    (KR) .......................... 10-2013-0076593

(51) Int. Cl.
| | | |
|---|---|---|
| *H04L 29/08* | (2006.01) | |
| *H04W 4/18* | (2009.01) | |
| *G06F 16/957* | (2019.01) | |

(52) U.S. Cl.
CPC .......... *H04L 67/02* (2013.01); *G06F 16/9574* (2019.01); *H04L 67/289* (2013.01); *H04W 4/18* (2013.01); *H04L 67/2857* (2013.01)

(58) Field of Classification Search
CPC ..... H04L 67/02; H04L 67/289; H04L 67/306; H04L 67/2857; H04L 67/2852; H04W 4/18; H04W 4/005; G06F 17/30902
See application file for complete search history.

(56) References Cited

U.S. PATENT DOCUMENTS 6,253,234 B1 * 6/2001 Hunt ................. G06F 17/30902
                                              707/999.01
9,160,796 B2 * 10/2015 Reeves ............... H04L 67/1095
(Continued)

FOREIGN PATENT DOCUMENTS

KR     10-2002-0011016 A     2/2002

OTHER PUBLICATIONS

International Search Report dated Sep. 30, 2014 in connection with International Application No. PCT/KR2014/005869; 3 pages.

*Primary Examiner* — Chris Parry
*Assistant Examiner* — Stephen J Houlihan

(57) ABSTRACT

A method for controlling a connection of a mobile device to a web server by an in-device web proxy includes transmitting a connection request to the web server when a web browser running on a first Operating System (OS) makes the connection request for connecting to the web server. The method also includes caching information included in a connection response when the connection response is received from the web server in response to the connection request. The method further includes transmitting the cached information matched to a new connection request to the web browser or the web server, when the web browser running on the first OS or a web browser running on a second OS different from the first OS makes the new connection request for connecting to the web server.

18 Claims, 27 Drawing Sheets

(56) References Cited

U.S. PATENT DOCUMENTS

| | | | |
|---|---|---|---|
| 2002/0062375 A1* | 5/2002 | Teodosiu | H04L 29/06 709/226 |
| 2004/0064819 A1 | 4/2004 | LaVoie et al. | |
| 2006/0168349 A1* | 7/2006 | Van Geest | G06F 17/30905 709/247 |
| 2006/0212585 A1* | 9/2006 | Eaton | G06Q 30/08 709/227 |
| 2008/0289029 A1* | 11/2008 | Kim | G06F 17/30905 726/12 |
| 2011/0320450 A1* | 12/2011 | Liu | G06F 17/30876 707/737 |
| 2012/0072388 A1 | 3/2012 | Ueda | |
| 2012/0117664 A1* | 5/2012 | Ezell | G06Q 10/103 726/30 |
| 2013/0145017 A1* | 6/2013 | Luna | H04L 67/32 709/224 |
| 2016/0036929 A1* | 2/2016 | Leal | H04L 67/22 709/224 |

* cited by examiner

MOBILE DEVICE AND METHOD FOR CONTROLLING TRANSMISSION TO WEB SERVER IN MOBILE DEVICE

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2013-0076593, filed on Jul. 1, 2013, which is hereby incorporated by reference for all purposes as if fully set forth herein.

TECHNICAL FIELD

The present disclosure relates to a mobile device and a method for controlling a connection to a web server in the mobile device.

BACKGROUND

The mobile devices can connect to base stations of the mobile network, and perform wireless communications. Web service traffic of the mobile devices can go through an Internet Protocol (IP) network of a Network Service Provider (NSP), pass through an Internet, and can be transmitted to the web server. Web service content can be transmitted through the relevant path.

SUMMARY

A first problem of the prior art related to the present disclosure is that technologies up to now for improving the transmission speed of a web service have paid attention to only the transmission of content from a web server to a mobile device and thus, a technological improvement in the transmission of data from the mobile device to the web server has not been made as compared with the transmission of content from the web server to the mobile device. Specifically, research aimed at improving a response speed by using compression, caching, or the like has previously been performed on the transmission of data from the web server to the mobile device. However, research has not been performed on a speed improvement in the transmission of data from the mobile device to the web server. Particularly, the network proxy server illustrated in FIG. 2 is located after already passing through a wireless section, from the viewpoint of the mobile device. Accordingly, the network proxy server cannot provide any improvement in the wireless section greatly affecting data transmission performance.

A second problem is that, in the case of the mobile device, an existing technology for improving web performance is proposed in such a manner as to be limited to a web browser. Specifically, as in an example illustrated in FIG. 5, when the different web browsers on the homogeneous or heterogeneous OSs within the mobile device connect to the identical web server, if content downloaded when the one OS connects to the web server identically is capable of being utilized in a case where another OS connects to the web server, a download speed that the user feels can be improved. However, at present, such support cannot be provided. Similarly, in the case where the mobile device operates as a hub as illustrated in FIG. 1 or FIG. 2, the additional devices cannot share content when connecting to the identical web server. Particularly, it is also problematic that neither a manufacturer that manufactures mobile devices nor a communication provider can play a role until the introduction of a new technology is applied to the web browser. Also, even when an OS provides the relevant technology, it takes a long time to perform an update at an OS level by applying the new technology to the OS, and the update of the OS goes through a complex process. As a result, a web technology or a performance improvement cannot help but be slow. Therefore, the above-mentioned problem has a subordinate relation in which it is required to wait for only advancement by a developer of a web browser or an OS.

A third problem is that cookie information for providing the continuity of a web service is very important from the viewpoint of a web service provider providing the web service but the continuity of the cookie information disappears if a used web browser is changed because the cookie information is managed in a unit of web browser. Also, the cookie information is typically deleted en bloc when the user optionally deletes a cookie, and thus the web service provider has difficulty in providing the continuity of the web service.

A fourth problem is that the web service is a technology optimized for the transmission of content between the web browser and the web server and thus does not actually support access to pieces of physical information of the mobile device (such as a UE). However, for highly-advanced services, a requirement becomes gradually larger for access to the pieces of physical information (such as GPS location information, sensor information, mobile device type information, etc.) of the mobile device. In order to allow each of the existing web browsers to access the pieces of physical information of the mobile device, a change in each of the existing web browsers itself is required. However, a need is required for changing a design philosophy which limits access to hardware resources of the existing web browsers. A fifth problem is that a web communication scheme focuses on information consumption although the mobile device is now gradually changed from an information consumer to an information producer. In the examples of FIGS. 1 and 2 as described above, when the mobile device generates an image captured by the camera, in-vehicle navigation information, environmental security information, and the like, the pieces of information do not need to be unconditionally transmitted to a network. Specifically, when the necessity arises, the network may connect to the relevant mobile device, and may bring the above-described pieces of information. However, at present, it is typical that the mobile device consumes content of the web server through the web browser. When it is necessary to upload data from the mobile device, the user or the mobile device needs to directly upload data to the web server by using a separate program.

To address the above-discussed deficiencies, it is a primary object to provide a technology for "in-device web proxy" which operates in such a manner as to be limited to a mobile device (other apparatuses connected to the mobile device) within the relevant mobile device as a means for optimizing backward transmission. The in-device web proxy, according to an embodiment of the present disclosure, can provide various technologies that embodiments of the present disclosure newly propose as well as an operation which applies a technology such as web content compression and the like to even a case of backward transmission.

Also, in order to solve at least the second problem, another embodiment of the present disclosure provides a new web acceleration technology through the in-device web proxy, and can provide transparency in the management of the in-device web proxy to a web browser or a web application which is a terminal for a web service within the mobile device. According to the web acceleration technology, in the case of, for example, a web page delivered by a web server, the web browser can first load content previously cached in the in-device web proxy and can quickly display the loaded content on a screen, and the web browser can download remaining content from a network and display the remaining content on the screen, while the cached content is displayed. Further, in order to solve the third problem, still another embodiment of the present disclosure provides a method in which the in-device web proxy can transparently manage a cookie, that the web server issues to a user, below the web browser in terms of a structure of the mobile device. Although the user can remove a cookie of the web browser, a cookie stored in the in-device web proxy may not be deleted together with the removed cookie of the web browser, and can be automatically delivered to the web server when the user reconnects to the identical site regardless of which web browser the user uses.

Further, in order to solve at least the fourth problem, yet another embodiment of the present disclosure provides a method in which the in-device web proxy can access various physical apparatuses included in the mobile device through an OS. At this time, in order to provide convenience to persons who develop web applications and to minimize the modification of a web browser, when the in-device web proxy accesses the various physical apparatuses, yet another embodiment of the present disclosure supports a text-based command system, such as HyperText Markup Language (HTML), JavaScript, and the like, which can be used by the existing web browsers. In addition, in order to solve at least the fifth problem, still yet another embodiment of the present disclosure allows the in-device web proxy to intactly use an existing web protocol that the web server or the neighboring additional devices can use, and to be capable of accessing information or content generated by the mobile device.

In order to solve the above-mentioned technical problems, in accordance with an aspect of the present disclosure, a method for controlling a connection of a mobile device to a web server by an in-device web proxy is provided. The method includes transmitting, if a connection request for connecting to the web server is generated by a web browser running on a first Operating System (OS), a connection request to the web server. The method also includes caching information included in a connection response if the connection response is received from the web server in response to the connection request. The method further includes transmitting, if a new connection request for connecting to the web server is generated by the web browser running on the first OS or a web browser running on a second OS different from the first OS, the cached information corresponding to the new connection request to the web browser or the web server.

In accordance with another aspect of the present disclosure, a mobile device is provided. The mobile device includes a communication unit configured to communicate with a web server. The mobile device also includes a storage unit configured to store information. The mobile device further includes a control unit configured to control to transmit, if a connection request for connecting to the web server is generated by a web browser running on a first Operating System (OS), a connection request to the web server, to cache information included in a connection response if the connection response is received from the web server in response to the connection request, and to transmit, if a new connection request for connecting to the web server is generated by the web browser running on the first OS or a web browser running on a second OS different from the first OS, the cached information corresponding to the new connection request to the web browser or the web server.

The technology for the in-device web proxy, according to embodiments of the present disclosure, can enable a technology for improving the performance of a web service to be applied within the mobile device, and can enable the differentiated optimization of content in which characteristics of a web browser are reflected. Also, the technology for the in-device web proxy, according to embodiments of the present disclosure, can transparently manage a cookie issued by a web server, and ensures the continuity of a web service by managing the cookie.

Also, the in-device web proxy, according to embodiments of the present disclosure, can acquire pieces of information of the various physical apparatuses included in the mobile device based on a text-based command delivered via a web browser, and can notify the user of the acquired pieces of information by displaying the acquired pieces of information in the form of text through the web browser. Accordingly, the in-device web proxy can remove a difficulty in which it is required to modify the web browser in order to access the various physical apparatuses, or a difficulty in which it is required to directly access a command of the OS.

Further, the in-device web proxy, according to embodiments of the present disclosure, can enable the existing web service developers to strengthen an uplink transmission technology by intactly utilizing a development scheme and a development technology up to now. Therefore, the in-device web proxy can enable an improved level of services to be maintained in a future mobile network.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. It should be noted that the technical terms in the specification are merely used for describing a specific embodiment but do not limit the scope of the present disclosure. Further, the technical terms in the specification should be construed as a meaning generally understood by those skilled in the art unless the terms are defined as another meaning and should not be construed as an excessively inclusive meaning or an excessively exclusive meaning.

In addition, a singular expression used in the specification can include a plural expression as long as they are clearly distinguished in the context. Throughout the specification, the terms such as "comprise" or "include" should not be construed as necessarily including all of the various component or steps described in the specification.

Figure 1:
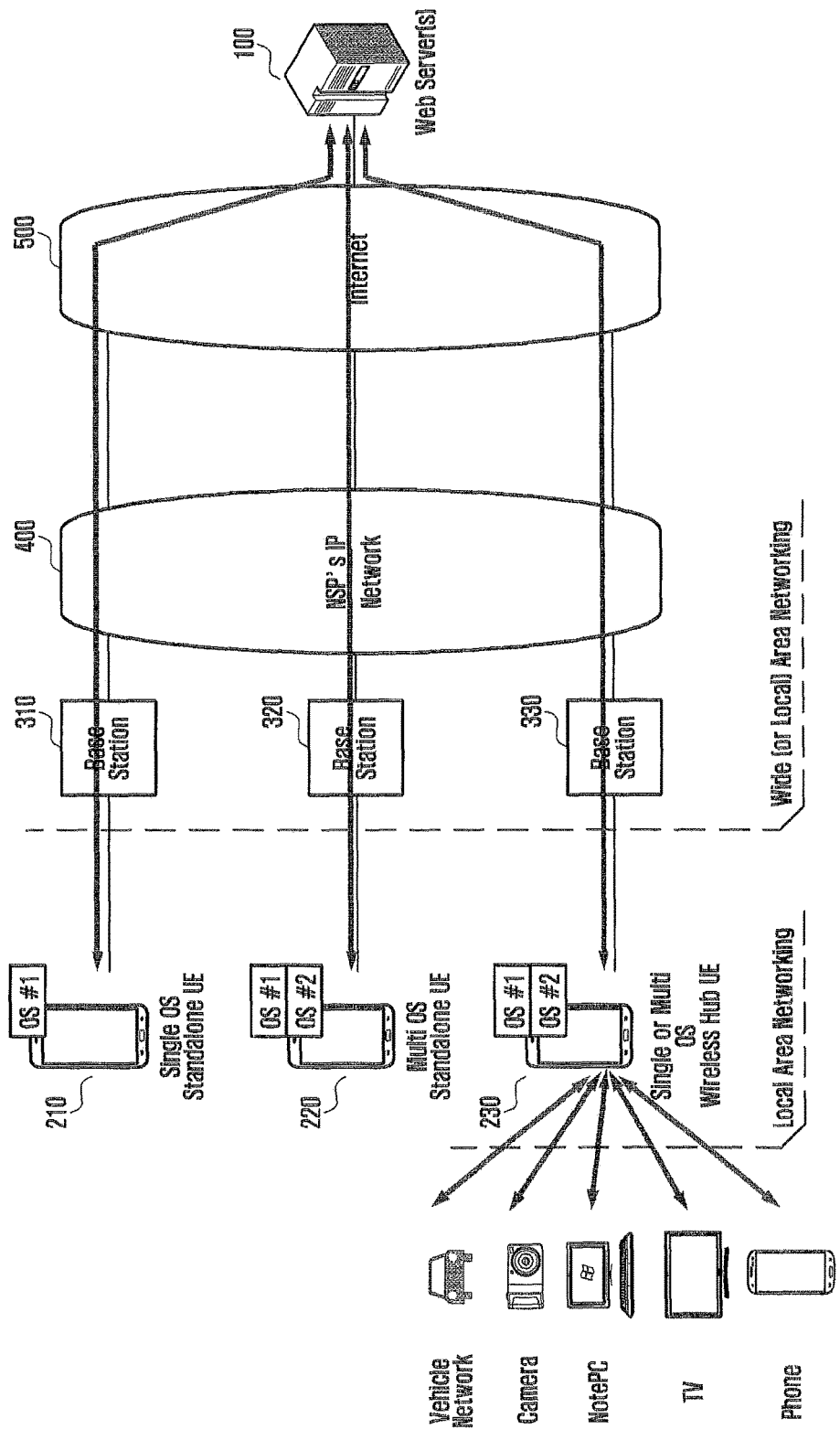
FIG. 1 is an example view illustrating a structure of a network according to this disclosure.

FIG. 1 is an example view illustrating a structure of a network according to this disclosure.

Referring to FIG. 1, a web server 100 which provides web services can be located at the right end of a network, and mobile devices 210, 220 and 230, which connect to the web server and use services, can be located at the left end thereof. Types of mobile devices can be divided into three types.

A first-type mobile device can be a single Operating System (OS) standalone User Equipment (UE), which can support only a single OS, and of which only the person himself/herself can connect to the network and can use a web service.

A second-type mobile device can be a multi-OS standalone UE, which can simultaneously support two or more OSs, but of which only the person himself/herself can connect to the network and can use a web service as in the case of the single OS standalone UE.

A third-type mobile device can be a UE, which can use a web service for itself while supporting a single or multiple OSs and simultaneously, can enable even other devices to receive the web service through itself. Referring to FIG. 1, other devices, which all receive the web service through the relevant UE, can be in-vehicle devices, a camera, a laptop computer, a smart Television (TV), a portable terminal, and the like. Such other devices can connect to a mobile device supporting a sort of hub function, mainly by using a short-range communication technology.

The three-type mobile devices 210, 220 and 230 respectively can connect to base stations 310, 320 and 330 of the mobile network, and perform wireless communications. Web service traffic of the mobile devices 210, 220 and 230 can go through an Internet Protocol (IP) network 400 of a Network Service Provider (NSP), pass through an Internet 500, and can be transmitted to the web server. Web service content can be transmitted through the relevant path.

Figure 2:
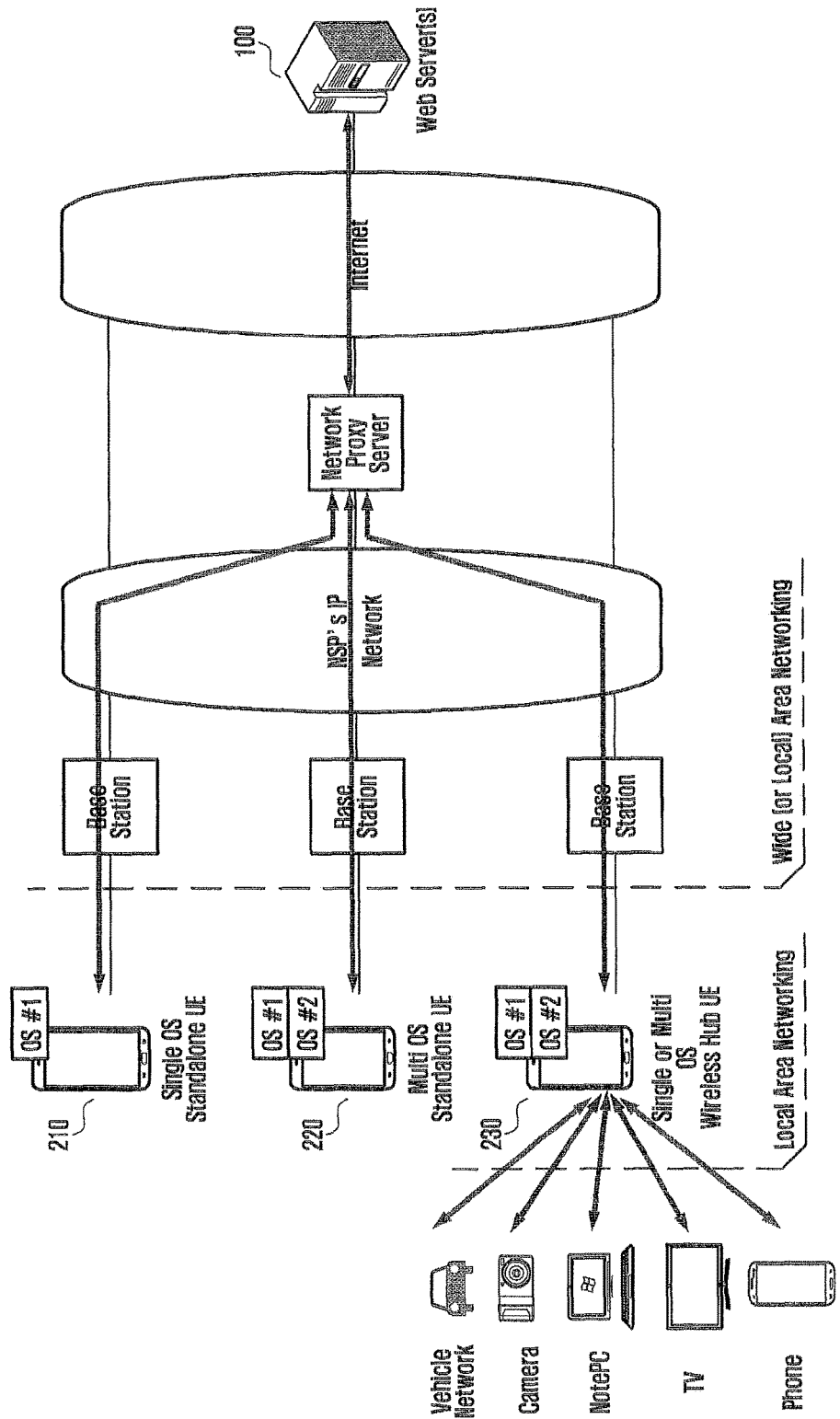
FIG. 2 is an example view illustrating a structure of a network to which a network proxy server is added according to this disclosure.

FIG. 2 is an example view illustrating a structure of a network to which a network proxy server is added according to this disclosure.

In the structure of the network illustrated in FIG. 2, the network proxy server can be added to the network illustrated in FIG. 1. The network proxy server can be located mainly near the side of a mobile device which uses a web service. The network proxy server can have cached content of the web server located at a distance, delivers, instead of the web server, the content of the web server to the mobile device, and thereby can increase the speed of downloading the content that a user of the mobile device feels.

Figure 3:
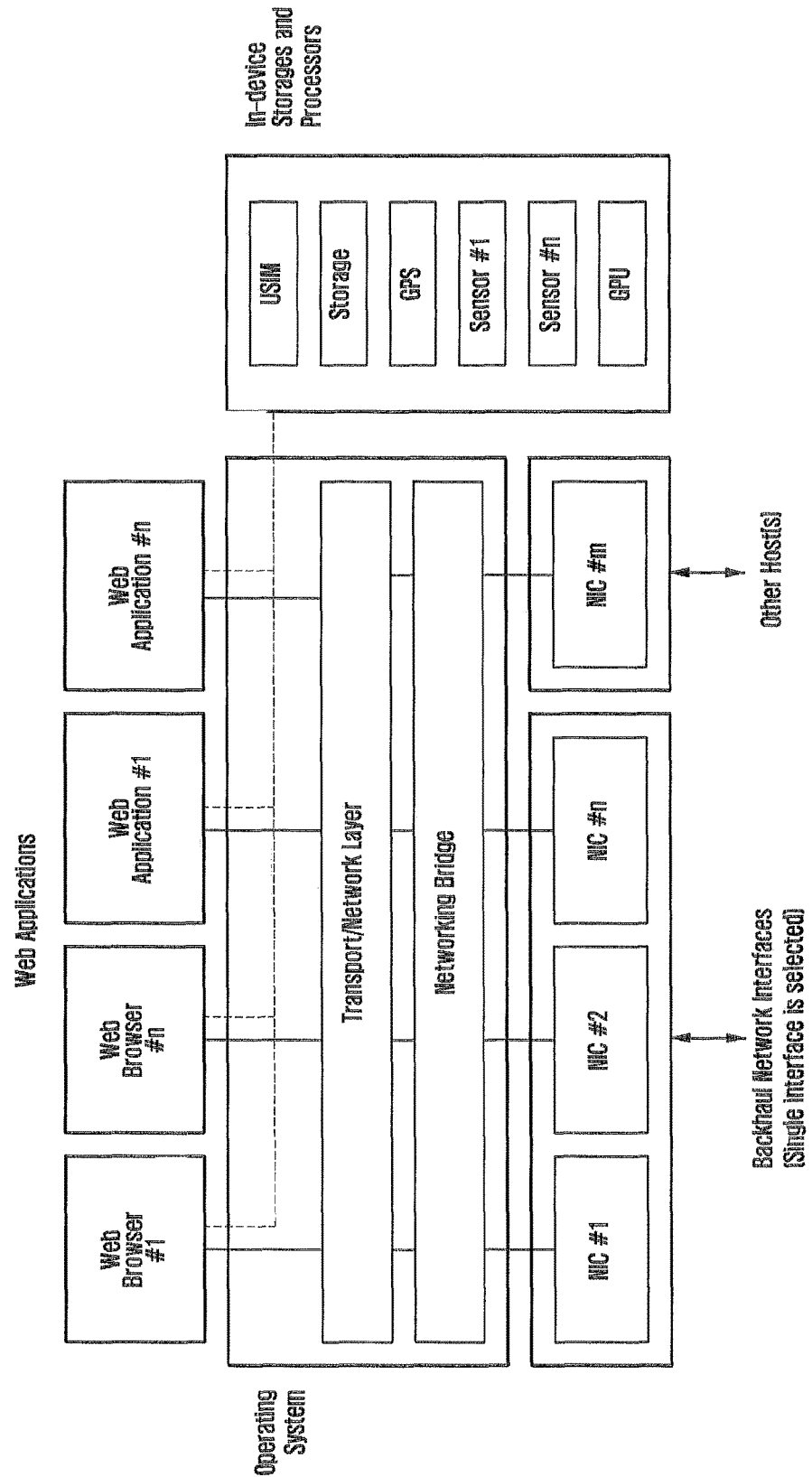
FIG. 3 is an example block diagram illustrating a structure of a mobile device supporting a single OS according to this disclosure.

FIG. 3 is an example block diagram illustrating a structure of a mobile device supporting a single OS according to this disclosure.

Referring to FIG. 3, the mobile device can include web browsers and web applications, which can use a web service, at the uppermost end, and can include a transport layer protocol, which can utilize the web browsers and web applications, below the web browsers and web applications. The transport layer protocol can exist as a part of the OS. In FIG. 3, the transport layer protocol can include a transport/network layer and a network bridge.

When the necessity arises, the transport layer protocol can access an additional apparatus that the OS manages within limits of functions that the web browsers support. When the web browsers are limited, the transport layer protocol may not access the additional apparatus.

Examples of the additional apparatus can include a Universal Subscriber Identity Module (USIM) within the mobile device, which can store user information; a storage apparatus such as a hard disk or a micro-Secure Digital (micro-SD) card; a Global Positioning System (GPS); various sensors including sensor #1 to sensor #n; a Graphics Processing Unit (GPU); and the like.

A Network Interface Card (NIC), which connects various services and processes to an external network, can be implemented at a lower end of the transport layer protocol. Examples of the NIC can include a Wireless Local Area Network (WLAN) card, a cellular mobile communication card, and the like. The mobile device can include multiple NICs in most cases. Typically, one of the multiple NICs can be selected and used to connect to a base station. Also, some of the multiple NICs can be used for the purpose of supporting mobile communication of other peripheral devices as in the case of the third-type mobile device from among the mobile devices of the types described with reference to FIGS. 1 and 2.

Figure 4:
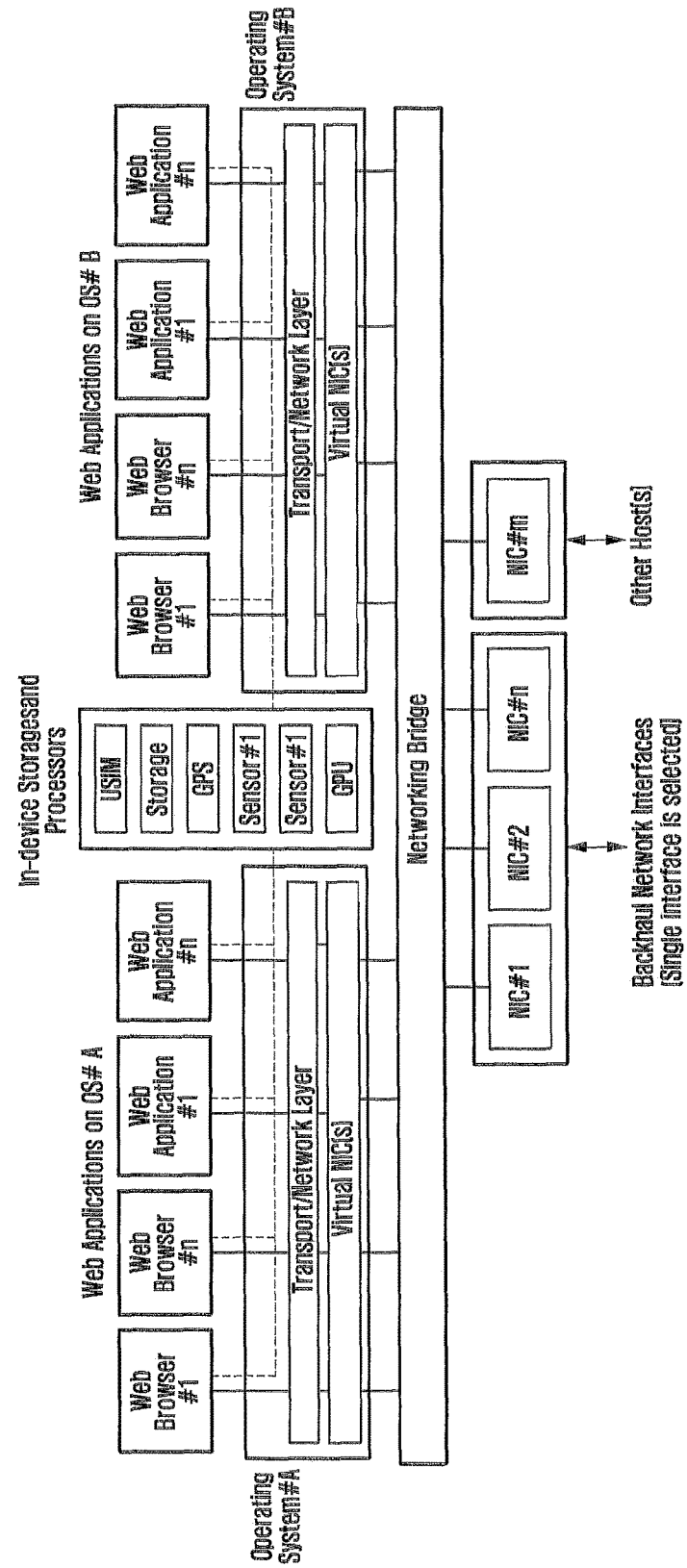
FIG. 4 is an example block diagram illustrating a structure of a mobile device supporting multiple OSs according to this disclosure.

FIG. 4 is an example block diagram illustrating a structure of a mobile device supporting multiple OSs according to this disclosure.

The mobile device illustrated in FIG. 4 can have an internal structure of the mobile device supporting the multiple OSs as in the case of the second-type mobile device and the third-type mobile device from among the mobile devices of the above-described types.

A difference between the mobile device illustrated in FIG. 4 and the mobile device illustrated in FIG. 3 is that OS #A and OS #B can simultaneously operate on an identical mobile device. Accordingly, web browsers and web applications respectively related to multiple OSs can operate, and the multiple OSs can have respective transport/network layer protocols. Also, each of the transport/network layer protocols can be connected to a networking bridge which controls/manages an actual physical NIC through a virtual NIC. The multiple OSs can simultaneously share and use additional apparatuses (such as a USIM, a hard disk, a GPS, and the like) within the mobile device.

Figure 5:
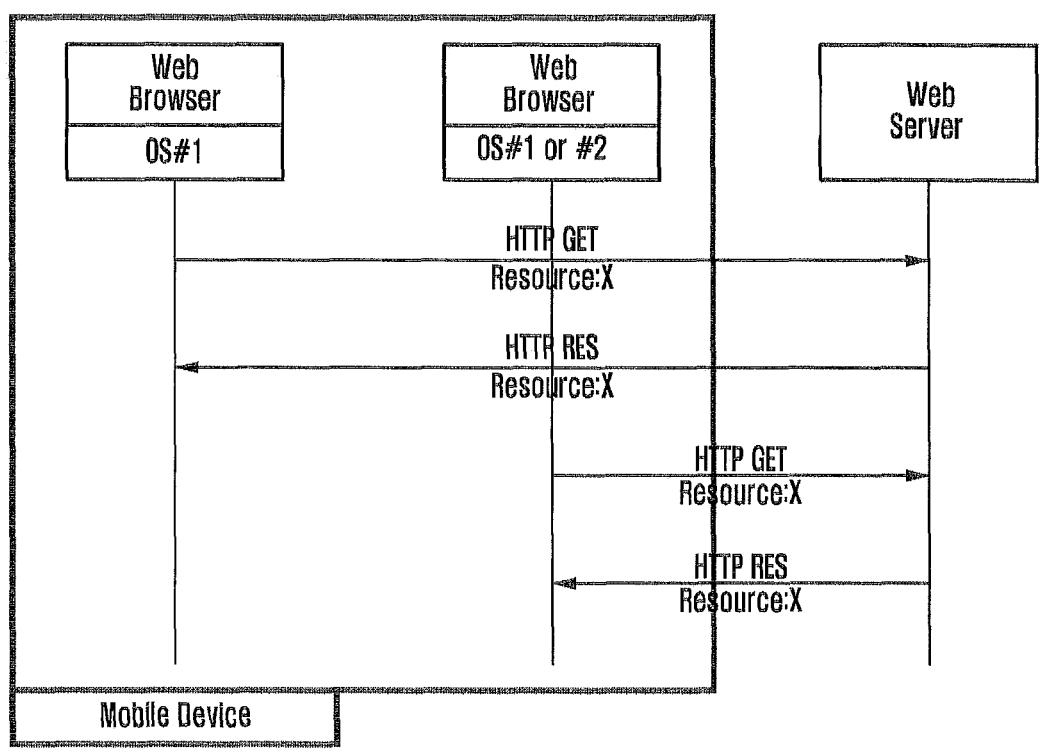
FIG. 5 is an example signal flow diagram illustrating an example of an operation in which web browsers (or web applications) located on homogeneous or heterogeneous OSs connect to an identical web server in a mobile device according to this disclosure.

FIG. 5 is an example signal flow diagram illustrating an example of an operation in which web browsers (or web applications) located on homogeneous or heterogeneous OSs connect to an identical web server in a mobile device according to this disclosure.

Referring to FIG. 5, the web browsers located on the homogeneous or heterogeneous OSs can independently connect to the web server, namely, independently exchange an HTTP GET message and an HTTP RES message with the web server. Accordingly, even when the two web browsers can connect to an identical web server, it can be noted that operations are not related to each other between the two web browsers.

Hereinafter, embodiments of the present disclosure will be described in more detail with reference to the accompanying drawings.

Figure 6:
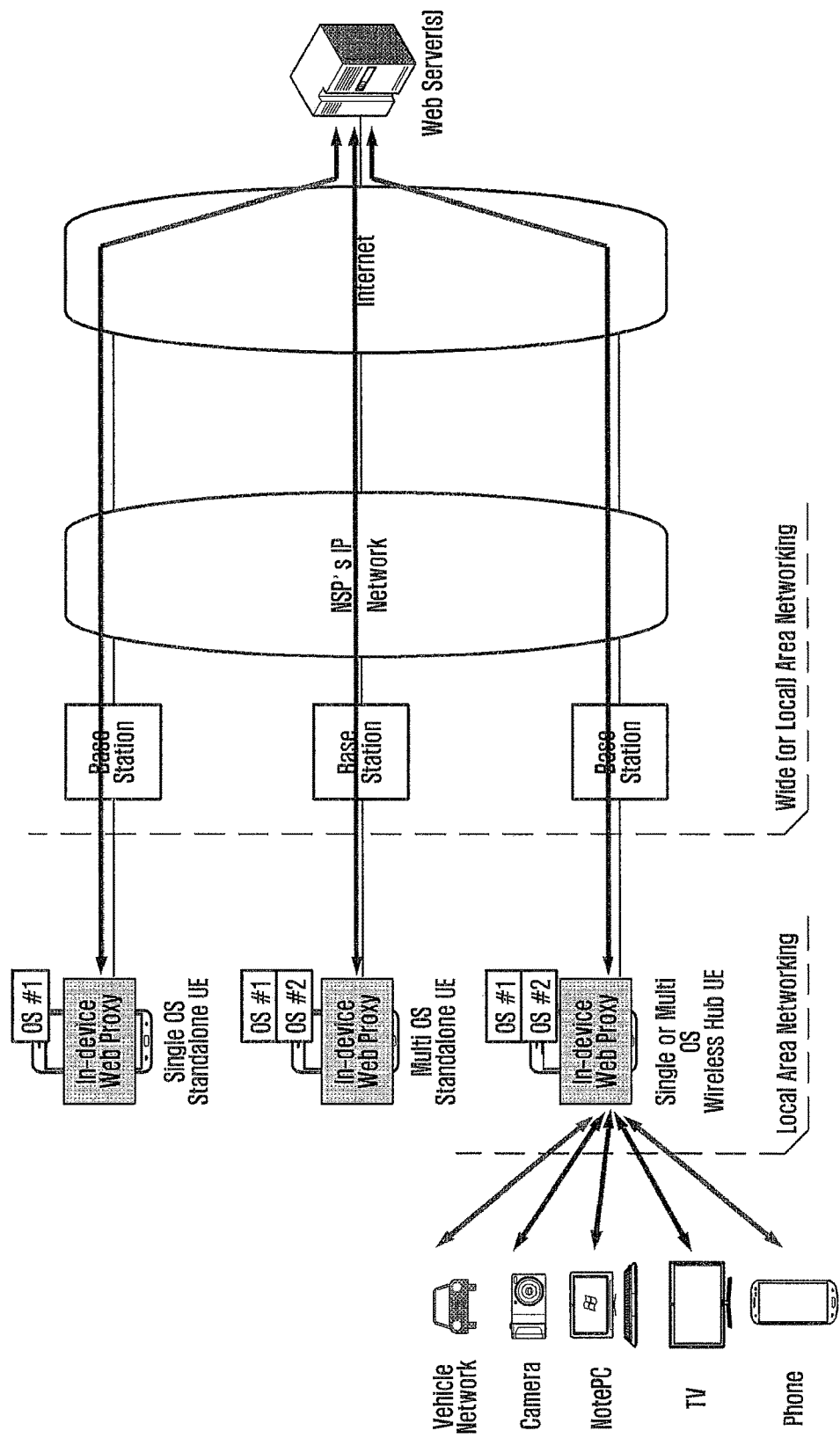
FIG. 6 is an example view illustrating a structure of a network according to a first embodiment of this disclosure.

FIG. 6 is an example view illustrating a structure of a network according to at least a first embodiment of this disclosure.

Referring to FIG. 6, a case is considered in which the network according to the first embodiment of this disclosure does not include a network proxy server and can include at least one mobile device within which an in-device web proxy is included.

The in-device web proxy can transparently operate with respect to a web browser and a web application which operate on the mobile device. When the network proxy server exists, the in-device web proxy can transparently operate with respect to the network proxy server.

Figure 7:
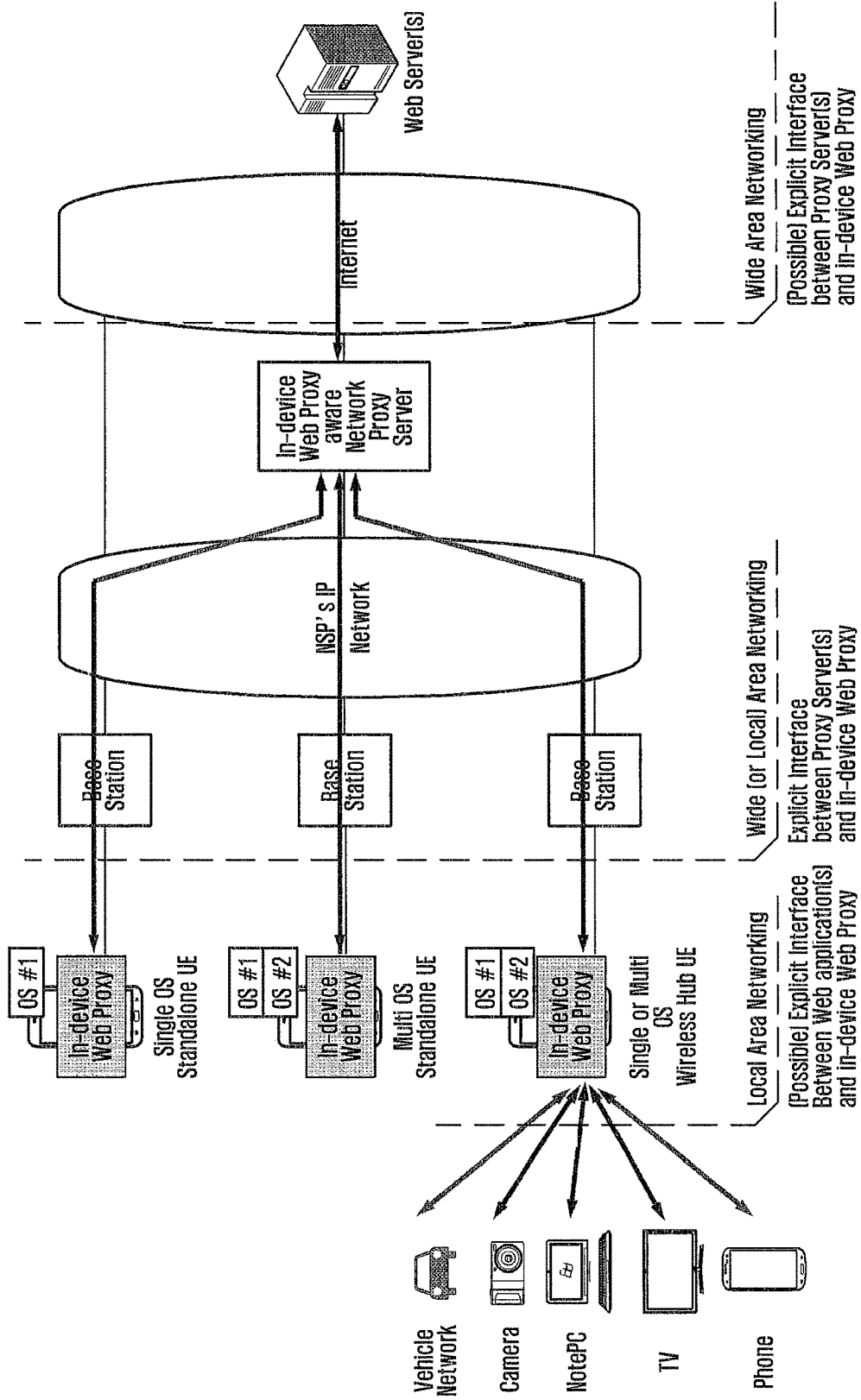
FIG. 7 is an example view illustrating a structure of a network according to a second embodiment of this disclosure.

FIG. 7 is an example view illustrating a structure of a network according to at least a second embodiment of this disclosure.

Referring to FIG. 7, the network according to the second embodiment of this disclosure additionally includes a network proxy server to the structure of the network illustrated in FIG. 6.

FIG. 7 illustrates an example concept, in which the network proxy server and an in-device web proxy operate in a situation of identifying and recognizing each other, and in which the in-device web proxy and a web browser and a web application within a mobile device operate in a situation of identifying and recognizing each other according to this disclosure. Such a configuration can support not only a technology in which the in-device web proxy transparently operates with respect to the network proxy server and the web browser/the web application within the mobile device, but also an additional advanced technology.

Figure 8:
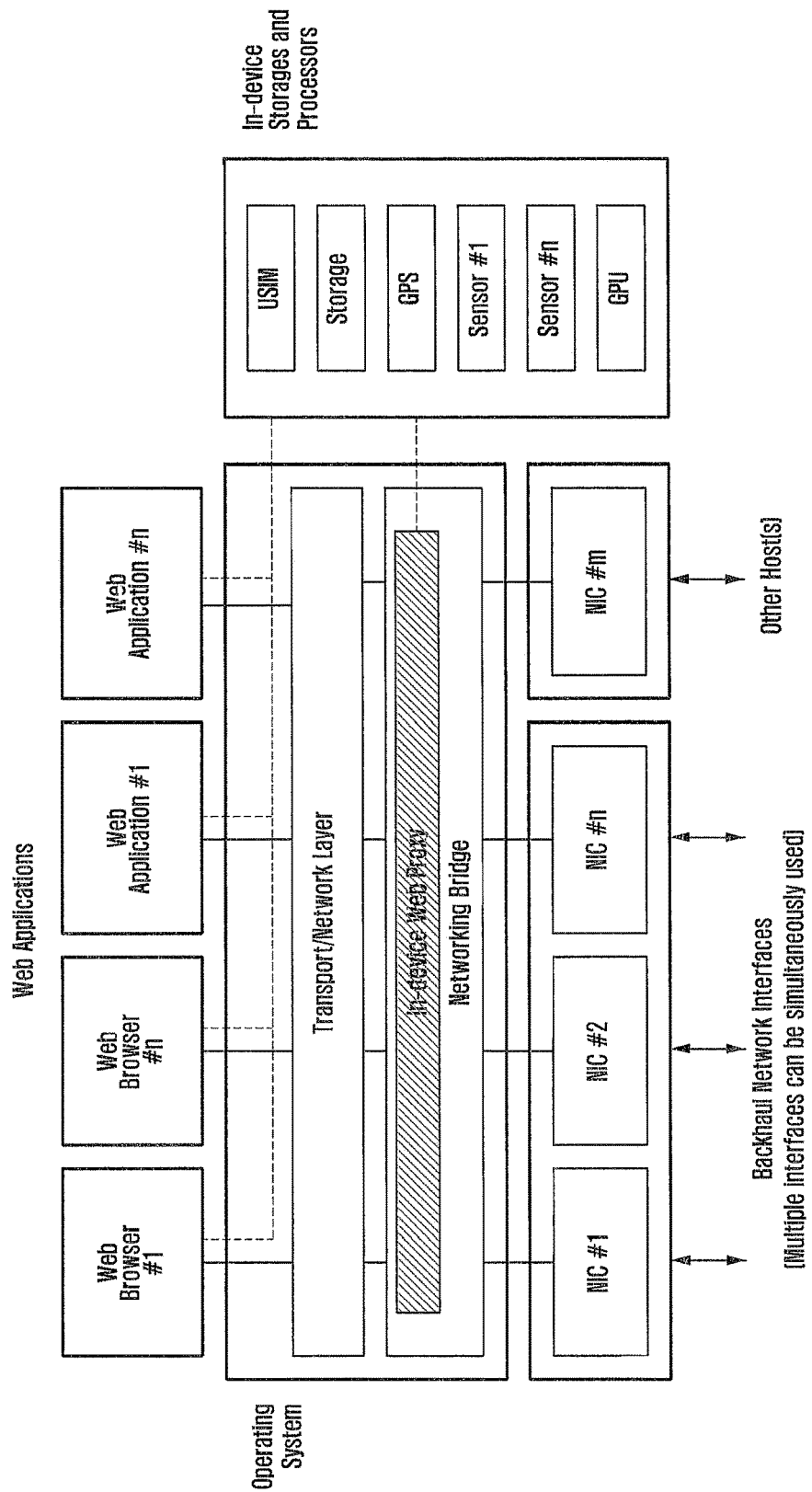
FIG. 8 is an example block diagram illustrating a structure of a mobile device supporting a single OS according to this disclosure.

FIG. 8 is an example block diagram illustrating a structure of a mobile device supporting a single OS according to this disclosure.

Referring to FIG. 8, the mobile device supporting the single OS, according to this disclosure, can include an in-device web proxy. In the mobile device supporting the single OS, the in-device web proxy can be included within a networking bridge, or at an upper end of the networking bridge. The in-device web proxy can communicate with a web browser and a web application through a transport/network layer, and can communicate with physical apparatuses located within the mobile device through an OS. Also, the in-device web proxy can control NICs managed by the networking bridge and can determine types/states and the like of the NICs, and can control the NICs based on a result of the determination.

In FIG. 8, the structure of the mobile device is illustrated in terms of software. However, physically, software codes of the in-device web proxy, the OS and the web browser can be stored in a storage unit included in the mobile device. A control unit can actually implement operations of the in-device web proxy, the OS and the web browser by executing the respective software codes. Also, the NICs can be referred to as a "communication unit" included in the mobile device.

Figure 9:
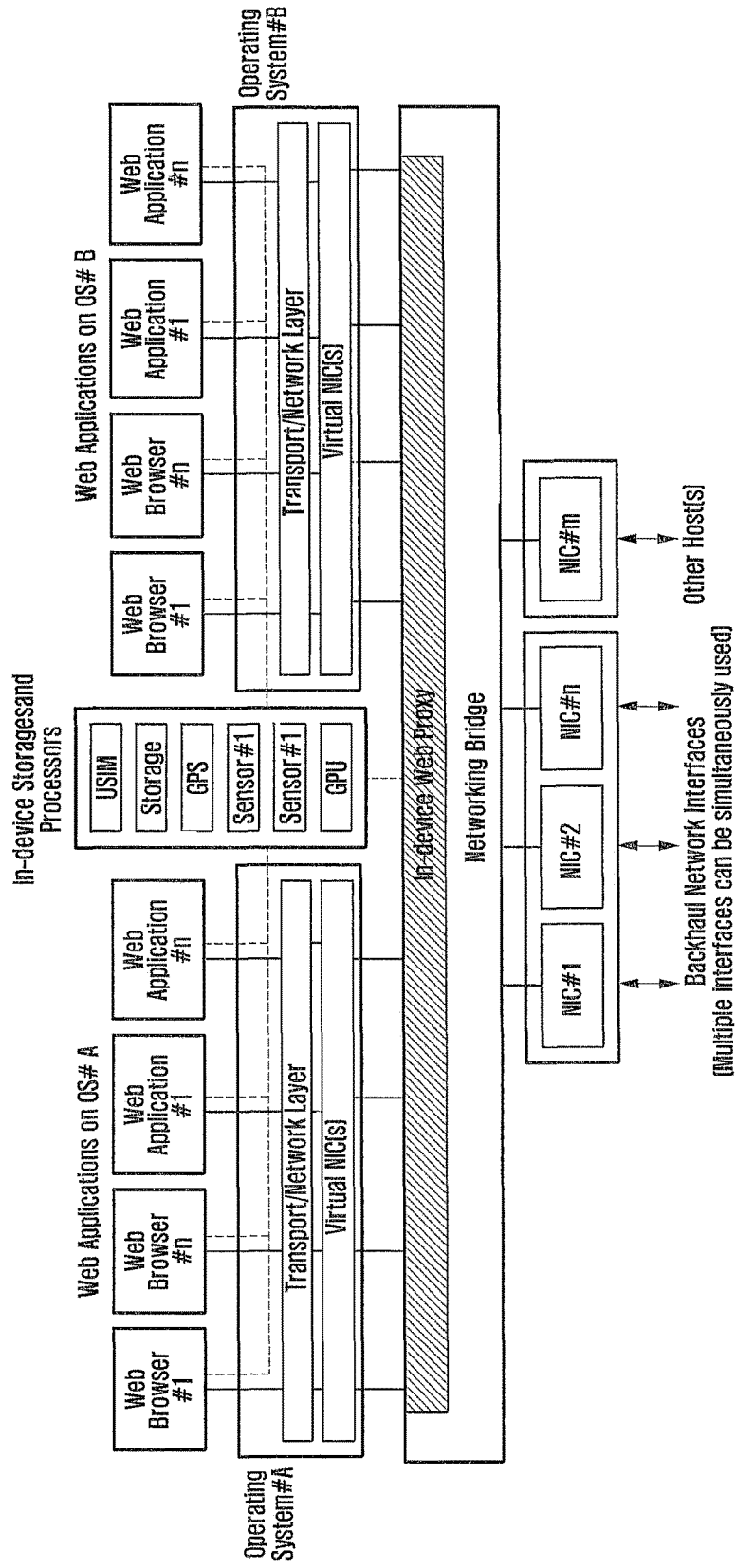
FIG. 9 is an example block diagram illustrating a structure of a mobile device supporting multiple OSs according to this disclosure.

FIG. 9 is an example block diagram illustrating a structure of a mobile device supporting multiple OSs according to this disclosure. Referring to FIG. 9, the mobile device supporting the multiple OSs, according to this disclosure, can include an in-device web proxy. In the mobile device supporting the multiple OSs, the in-device web proxy can be located below OS #A and OS #B, and can be implemented within a physical networking bridge.

In embodiments of the present disclosure, a case has been described as an example in which the in-device web proxy can be implemented within the physical networking bridge or at an upper end of the physical networking bridge. However, embodiments of the present disclosure may not be limited thereto. An in-device web proxy can be implemented which can extract web content from a networking bridge and operates on top of an OS as in the case of a typical application program. Alternatively, when a program is capable of being executed through a USIM and the like, an in-device web proxy can be implemented which operates within the USIM.

Hereinafter, multiple technologies proposed by the present disclosure will be described in detail with reference to respective embodiments.

Optimization of backward transmission of web traffic and improvement in loading time period in web browser through optimization of content of web server is provided.

Figure 10:
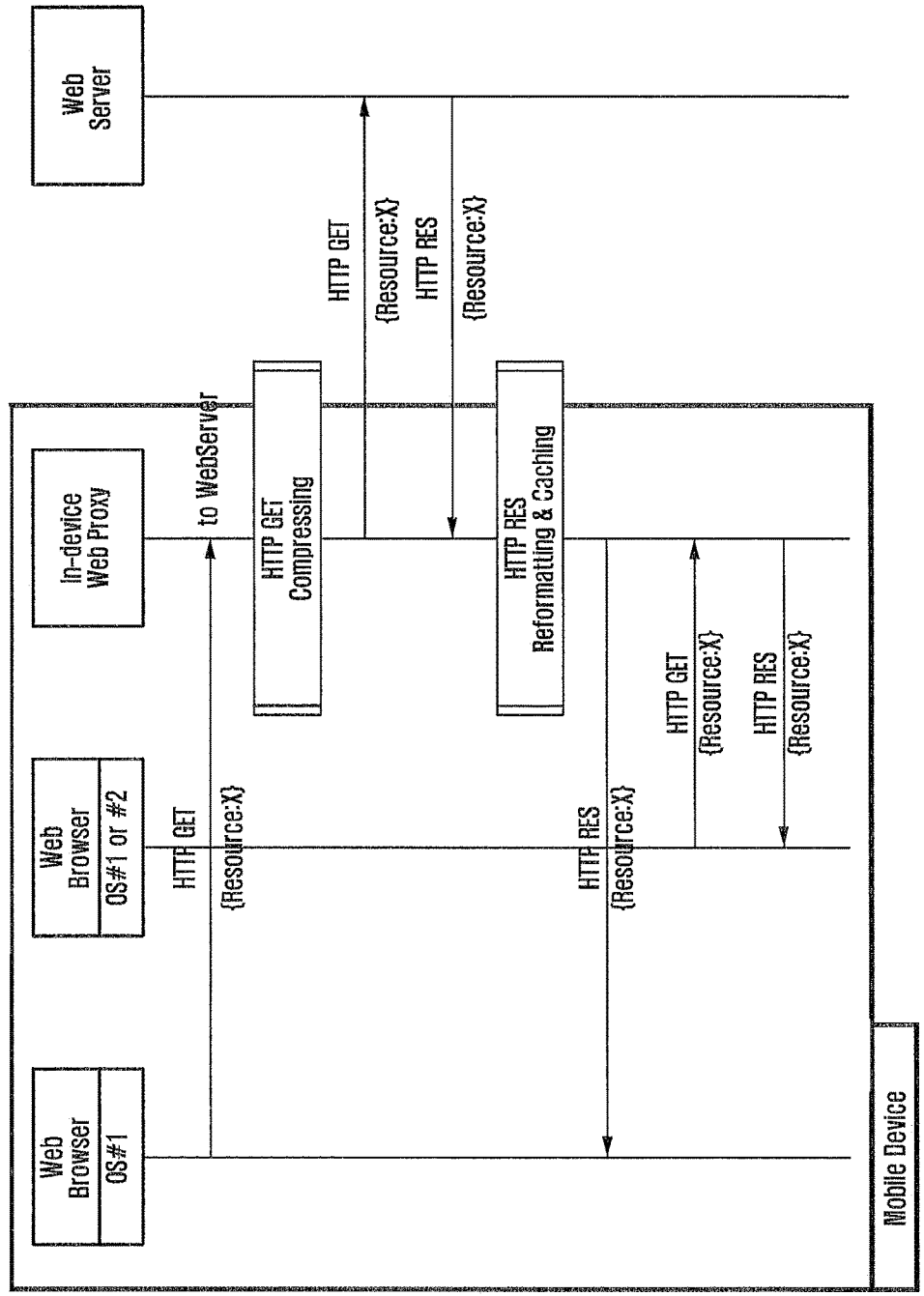
FIG. 10 is an example signal flow diagram illustrating a method for controlling a connection to a web server in a mobile device according to a first embodiment of this disclosure.

FIG. 10 is an example signal flow diagram illustrating a method for controlling a connection to a web server in a mobile device according to at least a first-embodiment of this disclosure.

Specifically, FIG. 10 is an example view illustrating a method for optimizing uplink (UL) transmission by the mobile device and improving a downlink (DL) loading time period through a process for reconstructing and caching content, according to at least the first embodiment of this disclosure.

In at least the first embodiment of this disclosure, when a web browser running on OS#1 attempts to connect to the web server, the web browser running on OS#1 can deliver an HTTP REQ message to an in-device web proxy. The in-device web proxy can compress the HTTP REQ message, and can deliver the compressed HTTP REQ message to the web server. Accordingly, the in-device web proxy can reduce a transmission time period over a mobile link and a processing time period in the web server.

In order to compress the HTTP REQ message that the in-device web proxy delivers in UL, typical HTTP REQ optimization technologies can be utilized. According to implementation, a technique different from the typical HTTP REQ optimization technologies can be applied.

Also, in at least the first embodiment of the present disclosure, when receiving the HTTP REQ message, the web server can transmit an HTTP RES to the in-device web proxy in response to the HTTP REQ message. When receiving the HTTP RES, the in-device web proxy can operate as a hub for transmitting web content to the mobile device or to an additional device which performs communication via the mobile device. Accordingly, the in-device web proxy can optimize the received HTTP RES (or DL web content included in a GTTP RES).

Figure 11:
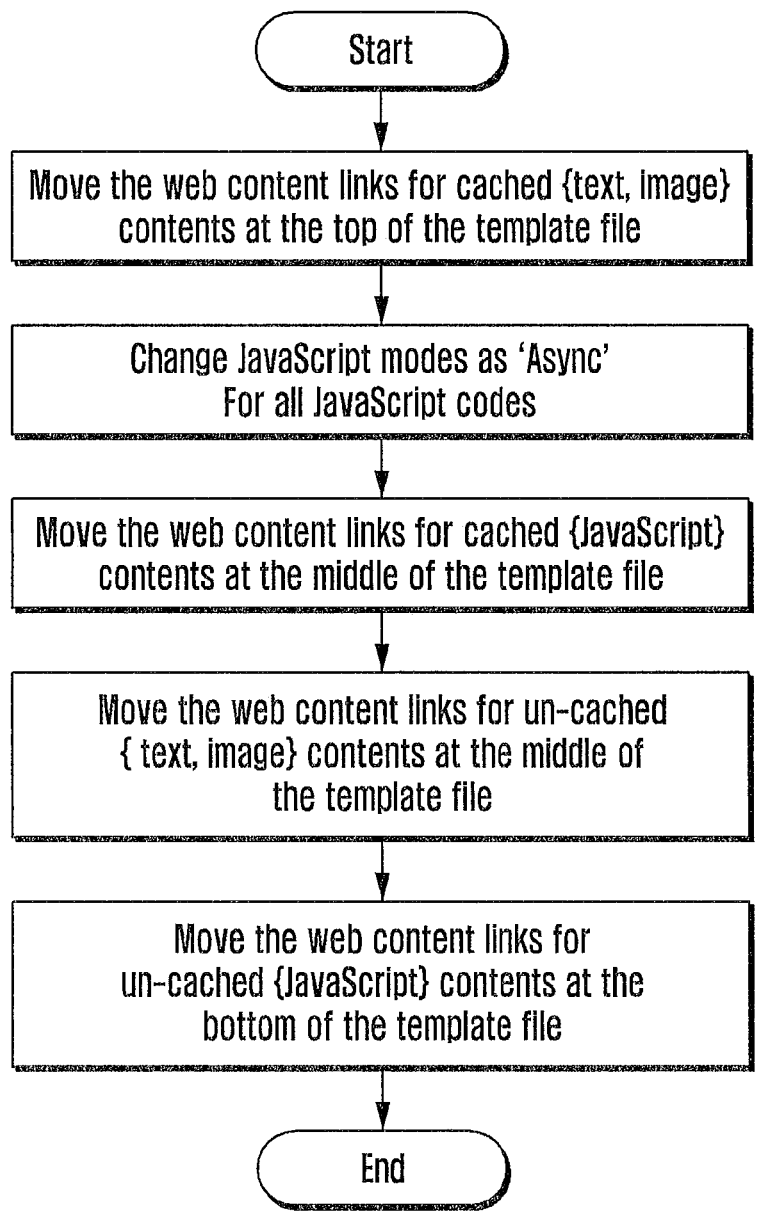
FIG. 11 is an example flowchart illustrating a method for optimizing an HTTP RES by an in-device web proxy according to this disclosure.

Specifically, referring to FIG. 11, first, the in-device web proxy can move a web content link for the cached content (such as text and an image) to the top of a template file. In other words, the in-device web proxy can determine whether content reusable in a cache of the in-device web proxy exists in the received HTTP RES or content included in the received HTTP RES, and can move a link value for the reusable content to the top of the template file. That is, each of the web browsers accesses related web content in sequential order disclosed in the template file when accessing the related web content based on the template file. Accordingly, the in-device web proxy can move the cached content to the top of the template file, and can allow each of the web browsers to first read the cached content. Therefore, the movement of the link value for the reusable content to the top of the template file can be for improving a download speed that the user feels.

Next, the in-device web proxy can modify a tag included in the HTTP RES so as to allow all java scripts included in the HTTP RES to operate in an asynchronous (or async) mode. The modification of a tag included in the HTTP RES can be for improving the download speed of the entire web content by solving a problem such that most web browsers which process the java scripts do not download or process different content while downloading or parsing a java script.

Then, in order to reuse the cached java script, the in-device web proxy can move a web content link for the cached java script to the middle of the template file.

Next, the in-device web proxy can place a web content link for uncached content (such as an image, text, etc.) below the web content link for the java script within the template file.

Lastly, the in-device web proxy can place a web content link for an uncached java script at the bottom of the template file.

In addition, the in-device web proxy can store content included in the HTTP RES in the cache thereof. An already-established technology or a separate specialized technology other than the above-described technologies can be applied to embodiments of the disclosure, but is left out of the discussion.

Referring back to FIG. 10, when completing the optimization of content received from the web server by using the HTTP RES, the in-device web proxy can deliver an optimized template file to the web browser running on OS#1, and can provide an improved response time period to the web browser running on OS#1.

When a web browser running on OS#1 or OS#2 sends a request for the identical content to the identical web server, the in-device web proxy can directly delivers content cached in the cache thereof to the web browser, and thereby enables the web browser to display web content at a fast speed. Also, the in-device web proxy caches content in the cache thereof, and directly provides the web browser with content identical to the cached content when the web browser requests the relevant content. As a result, the in-device web proxy can reduce a time period for using a mobile network, and enables the efficient use of the mobile network.

The above-described first embodiment of this disclosure can be applied to not only the case in which the mobile device includes the in-device web proxy, but also a network proxy server located in a network.

Management of cookie independent of web browser is provided.

Figure 12:
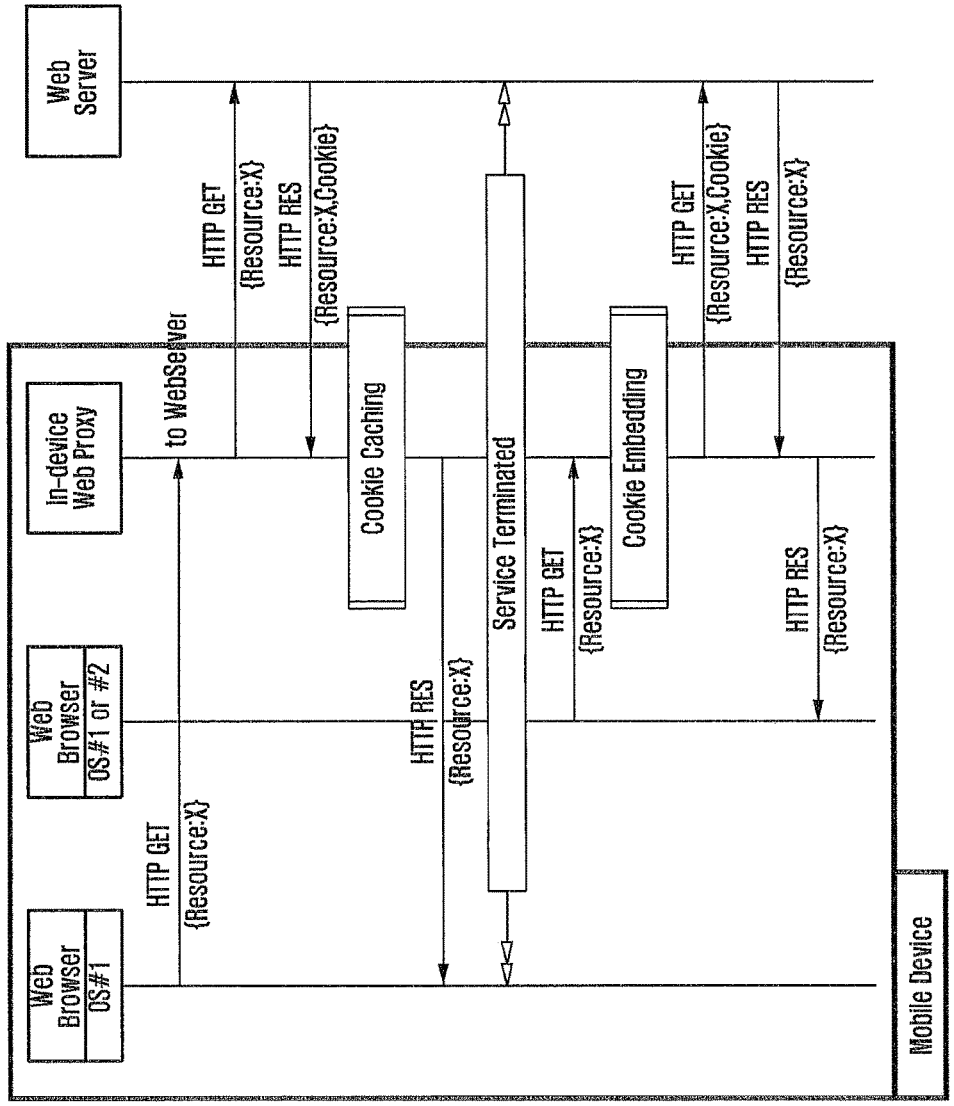
FIG. 12 is an example signal flow diagram illustrating a method for controlling a connection to a web server in a mobile device according to a second embodiment of this disclosure.

FIG. 12 is an example signal flow diagram illustrating a method for controlling a connection to a web server in a mobile device according to at least a second embodiment of this disclosure.

Specifically, FIG. 12 is an example view illustrating a method in which an in-device web proxy independently manages a cookie provided by the web server according to this disclosure.

First, a web browser running on OS#1 can transmit an HTTP REQ (or referred to as "HTTP GET") to the web server through the in-device web proxy. At this time, the web server can transmit back content requested by the HTTP REQ to the in-device web proxy, and can issue a cookie in order to maintain the continuity of a service when the mobile device subsequently connects to the identical web server.

When the HTTP RES including the cookie can arrive at the in-device web proxy, the in-device web proxy can independently manage the cookie.

Figure 13:
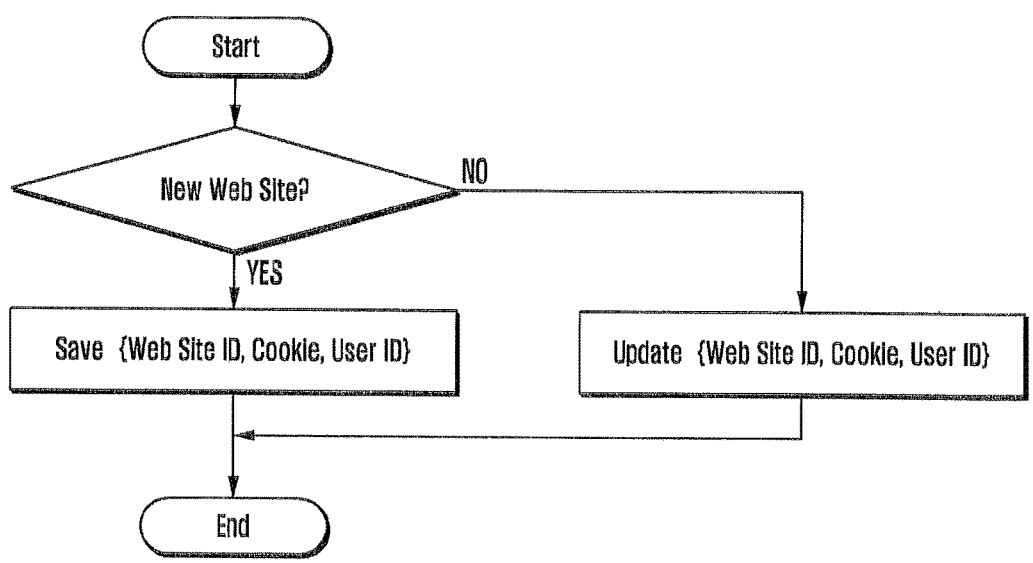
FIG. 13 is an example flowchart illustrating a method for storing a cookie by an in-device web proxy according to this disclosure.
Figure 14:
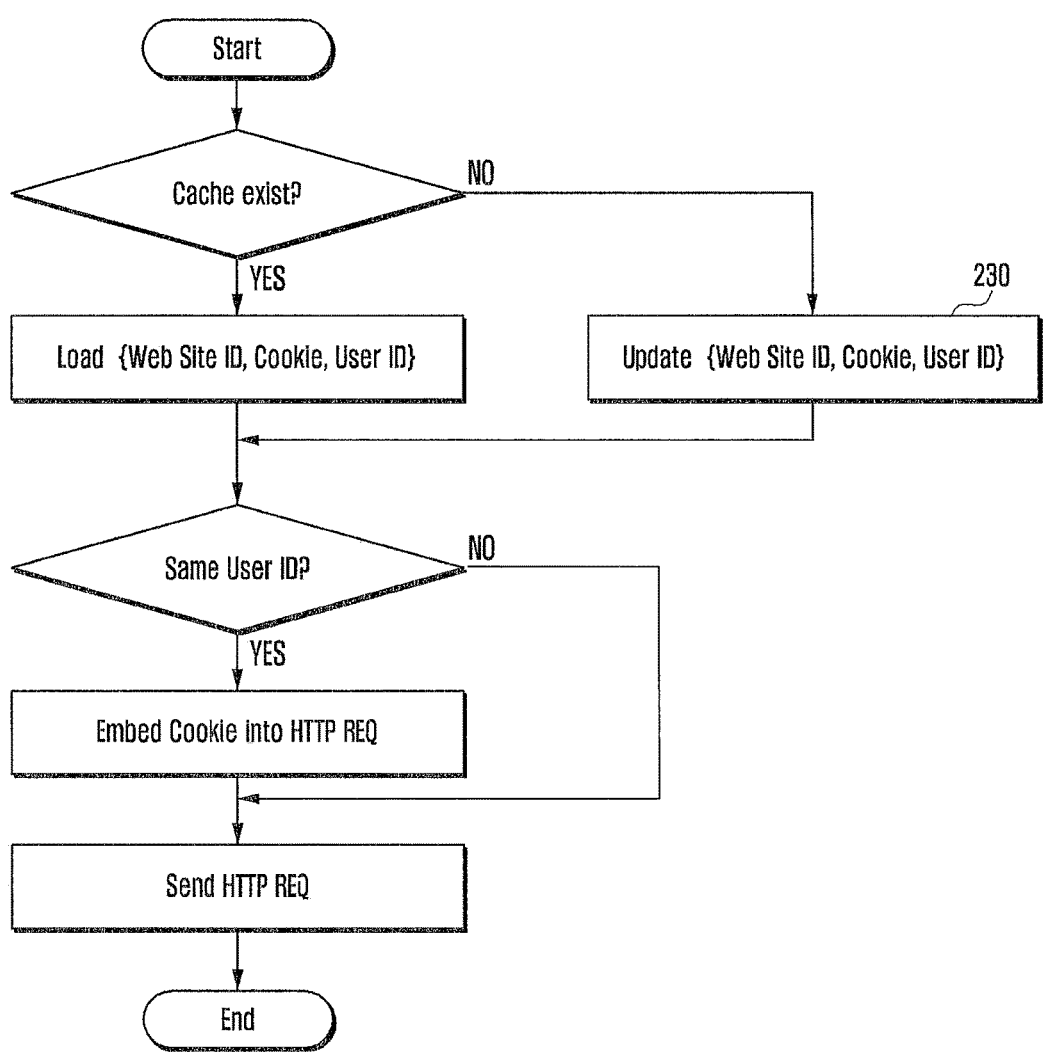
FIG. 14 is an example flowchart illustrating a method for acquiring a cookie and performing embedding processing by an in-device web proxy according to this disclosure.

Specifically, referring to FIG. 13, the in-device web proxy can determine whether a web site requested by the current HTTP REQ (such as a web site received through the HTTP RES) can be a newly-requested web site.

When the requested web site is not a newly-requested web site, the in-device web proxy can be storing a cookie issued by the web server during a previous connection to the web server. Accordingly, the in-device web proxy can update a cookie for the relevant web site to a newly-issued cookie.

When the requested web site is a newly-requested web site, the in-device web proxy can store a cookie issued by the web server. Information stored in association with the cookie can be information on an identifier of the web server, and can include information for identifying the web server, such as a domain name of the web server, an Internet protocol (IP) address thereof, or the like. The in-device web proxy can store, as it is, the cookie issued by the web server, and can additionally store an Identification (ID) of the user who has made the HTTP transaction of a currently-requested web page.

In the second embodiment of this disclosure, when the mobile device does not operate as a hub for neighboring devices, the in-device web proxy can ignore information included in the cookie, or can use an email address for identifying a registered user, etc. as cookie information through a separate setting process. In contrast, when the mobile device operates as a hub for neighboring devices, the in-device web proxy can utilize, as cookie information, physical information including a Media Access Control (MAC) address and the like of each of the neighboring devices which connect to the mobile device through short-range communication, or a user ID used in a short-range communication process.

Referring back to FIG. 12, the in-device web proxy which stores the cookie can deliver the HTTP RES, that the web server has delivered, to the web browser. Thereafter, after a relevant session is completed, when a web browser/a web application running on OS#1 or OS#2 attempts to connect to the identical web server, the in-device web proxy can perform a procedure illustrated in FIG. 14. Specifically, the in-device web proxy can determine whether a cookie issued by the web server previously exists in the cache with respect to the newly-requested web page.

When the cookie issued by the web server previously exists in the cache, the in-device web proxy can determine whether a user of the mobile device in a case where the in-device web proxy has stored the cookie in the cache is identical to a current user.

When the two users are identical to each other, the in-device web proxy can include the stored cookie in an HTTP REQ, and can deliver the HTTP REQ including the stored cookie to the web server. In contrast, when the two users are not identical to each other, namely, when a different user connects to the identical web server, the in-device web proxy may not include the stored cookie in the HTTP REQ, and can deliver the HTTP REQ, which may not include the stored cookie, to the web server.

When receiving the HTTP REQ including the cookie from the in-device web proxy, although the received cookie is not a cookie generated by the web browser, the web server can provide a service having continuity to the user by the help of the in-device web proxy.

Figure 15:
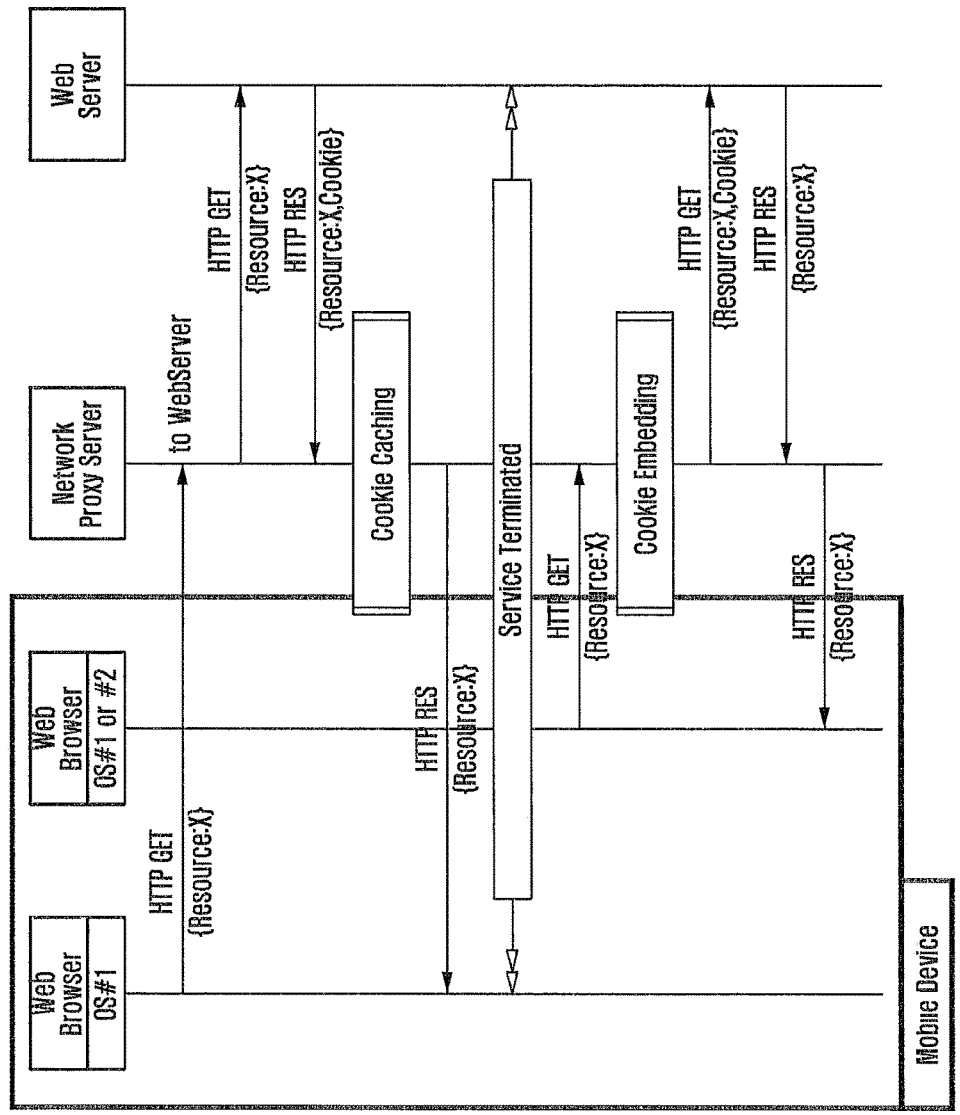
FIG. 15 is an example signal flow diagram illustrating an example of applying an operation according to a second embodiment of this disclosure to a network proxy server.

The second embodiment of this disclosure can not only be applied to the in-device web proxy, but can also be similarly applied to a network proxy server as illustrated in FIG. 15. Referring to FIG. 15, a case is considered in which a mobile device does not include an in-device web proxy and necessarily passes through the network proxy server in order to connect to a web server according to this disclosure. Also, the network proxy server performs an operation according to the second embodiment of the present disclosure.

Acquisition of information on physical apparatus within mobile device

Figure 16:
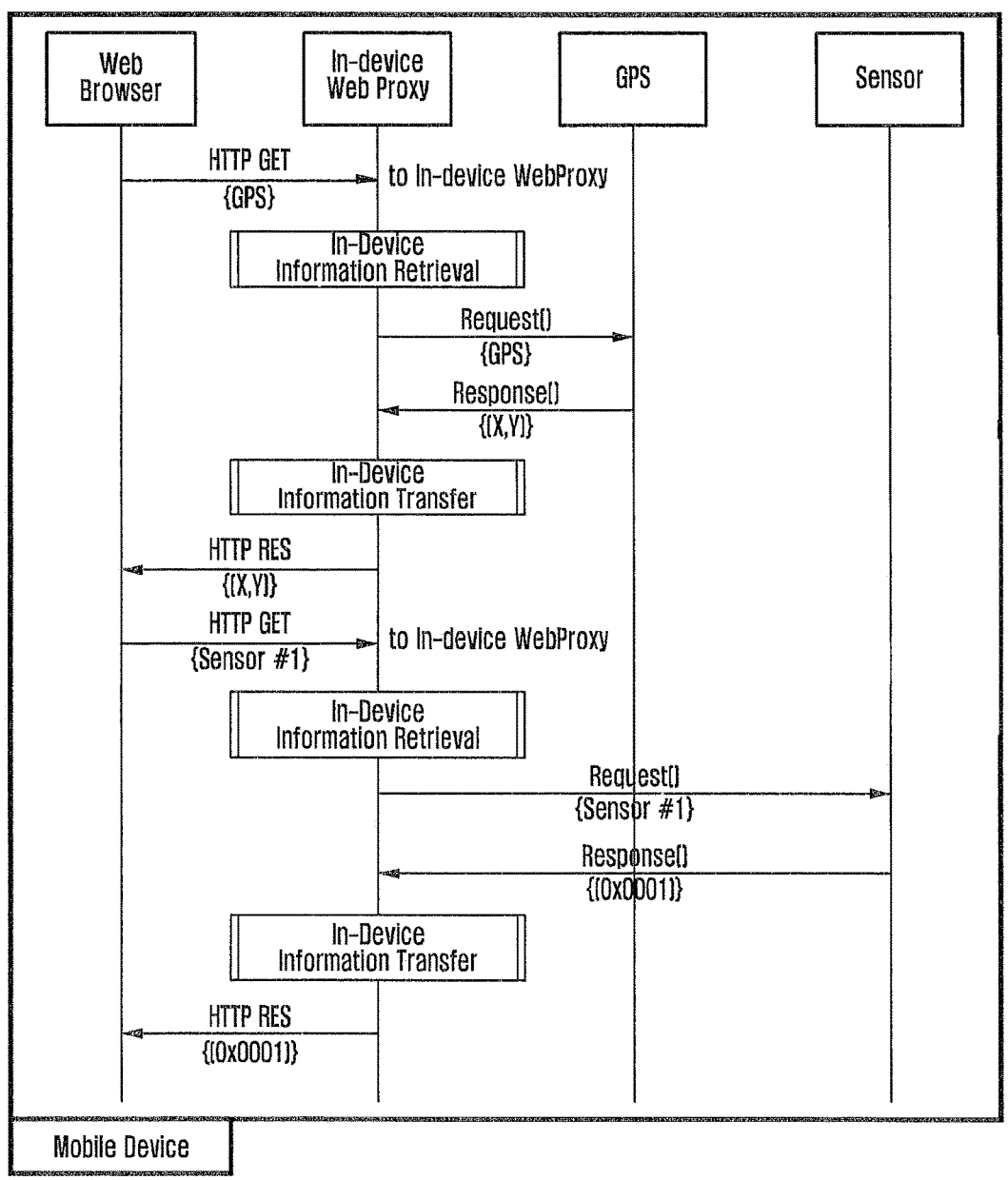
FIG. 16 is an example signal flow diagram illustrating a method for controlling a connection to a web server in a mobile device according to a third embodiment of this disclosure.

FIG. 16 is an example signal flow diagram illustrating a method for controlling a connection to a web server in a mobile device according to at least a third embodiment of the present disclosure.

Specifically, FIG. 16 is an example view illustrating a method in which a web browser reads GPS information and sensor information as pieces of information on physical apparatuses of the mobile device.

Figure 17:
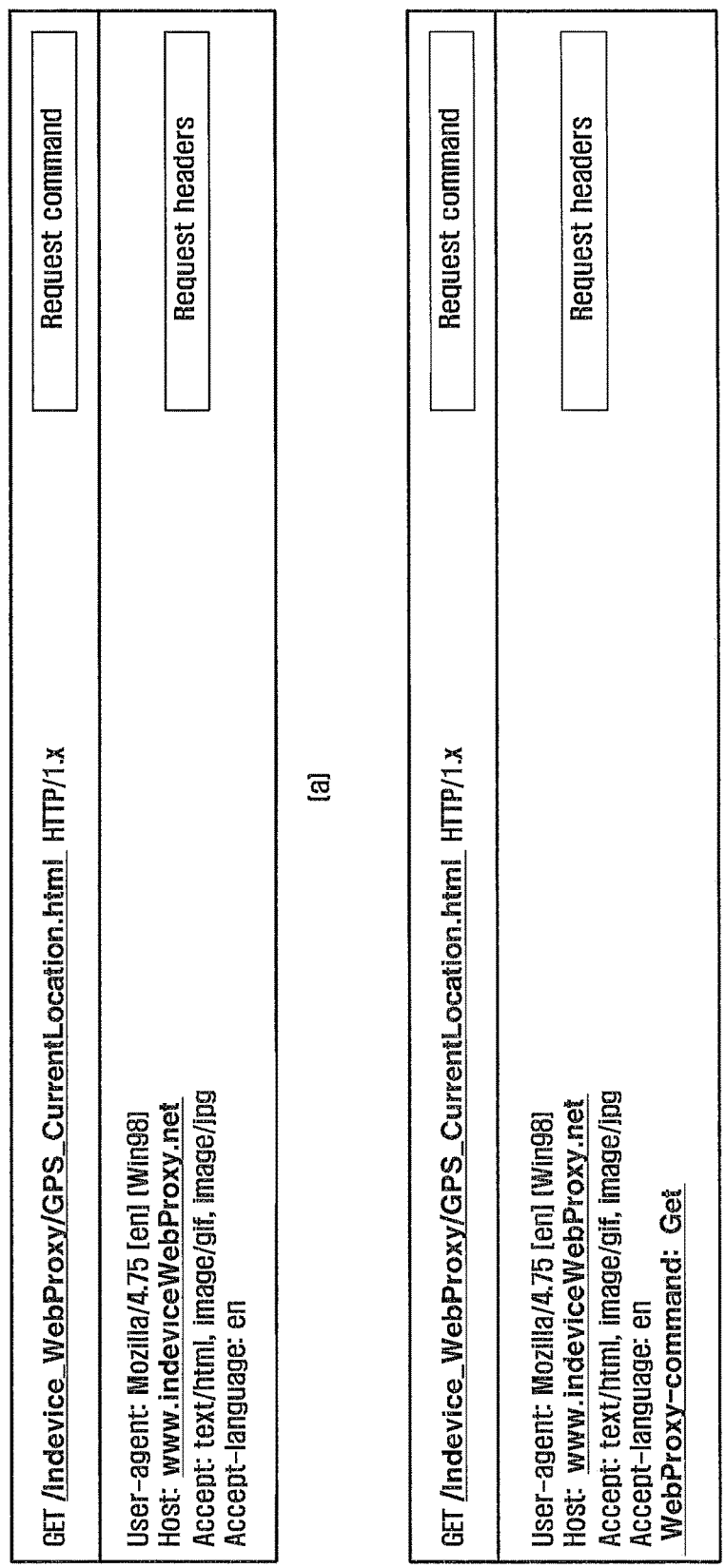
FIG. 17 is an example view illustrating an example of an HTTP GET message according to this disclosure.

First, the web browser can send a request for GPS information to an in-device web proxy through an HTTP GET. FIG. 17 illustrates an example of the HTTP GET, through which the web browser sends a request for GPS information to the in-device web proxy according to this disclosure. (a) of FIG. 17 illustrates an example of the HTTP GET for requesting GPS information (such as current location information of the mobile device). In (a) of FIG. 17, a request header can be identical to a typical request header for requesting web content. However, in (a) of FIG. 17, www.indeviceWebProxy.net which is a host address previously defined for the in-device web proxy, or only a part used to connect to an internal IP address which is previously defined, can be different from a case of a typical connection to a web server. A part of a request command which signifies a request for GPS information, can be identical to a typical case of requesting web content. However, to specify information storage location such as an Indevice_WebProxy directory as information storage space of the in-device web proxy, and to specify an extension named ".html" for a logical page name (such as GPS_CurrentLocation) matched to a physical apparatus of the mobile device which is desired to be read from the relevant storage location, can be different from a typical case of requesting web content. In an embodiment, it is also possible to include an additional command in a request header as illustrated in (b) of FIG. 17.

Figure 18:
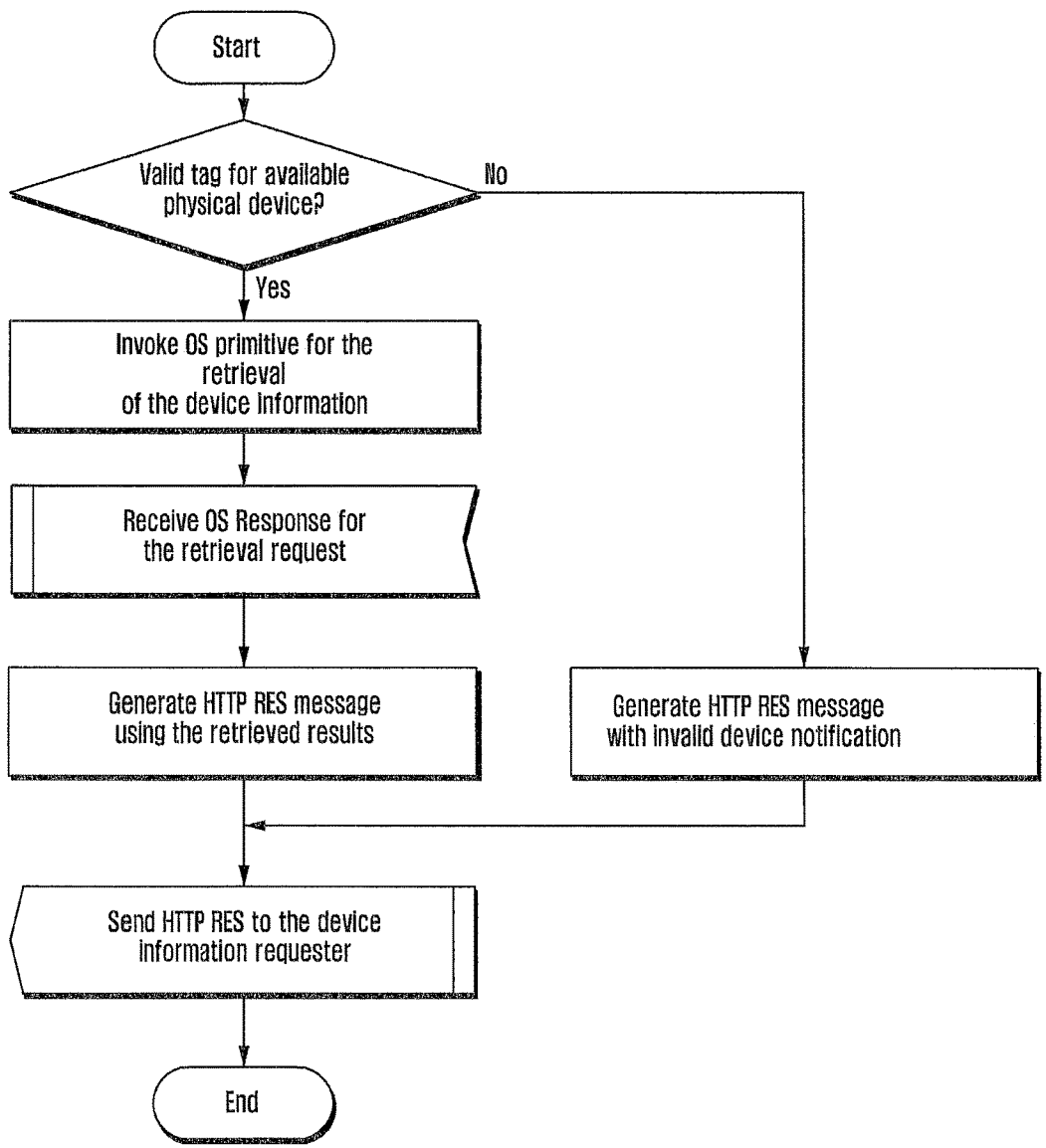
FIG. 18 is an example flowchart illustrating a method for loading and reporting information of a physical device by an in-device web proxy according to this disclosure.

The in-device web proxy which can receive the request for GPS information from the web browser through the HTTP GET, performs an operation illustrated in FIG. 18.

First, the in-device web proxy can determine whether a physical apparatus of which information has been requested through the HTTP GET is a physical apparatus supported by the mobile device. When the physical apparatus is not a physical apparatus supported by the mobile device, the in-device web proxy can deliver an HTTP RES including a warning message to the web browser. In contrast, when the physical apparatus is a physical apparatus supported by the mobile device, the in-device web proxy can access the relevant physical apparatus by using a support function of an OS, and can load information. For example, the in-device web proxy can access a GPS, and read current location information of the mobile device. Thereafter, the in-device web proxy can construct the loaded information in the form of an HTTP RES that the web browser understands, and can deliver the constructed information to the web browser.

Figure 19:
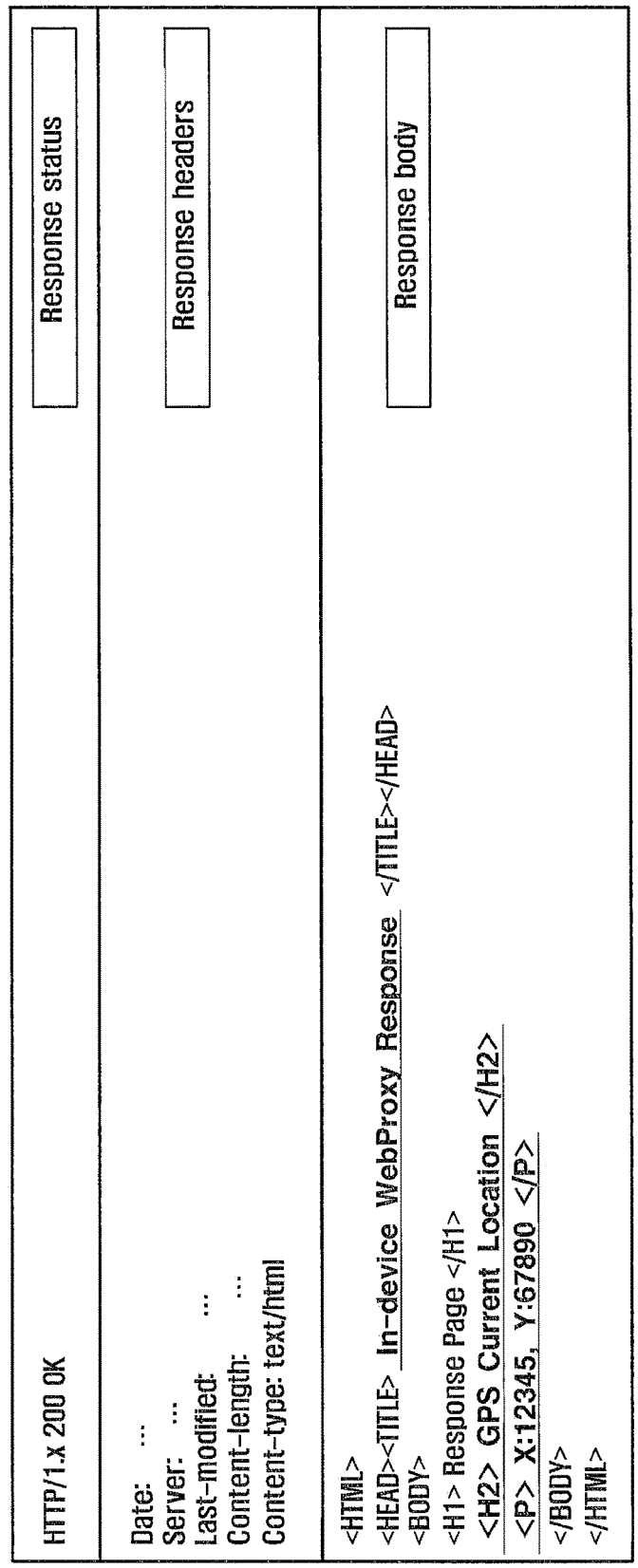
FIG. 19 is an example view illustrating an example of an HTTP RES message according to this disclosure.

FIG. 19 illustrates an example of the HTTP RES delivered from the in-device web proxy to the web browser according to this disclosure. Referring to FIG. 19, the HTTP RES message can include an HTML code representing a current location of the mobile device, which is measured by using the GPS. According to an embodiment of this disclosure, the in-device web proxy can utilize a form of an HTTP/HTML message to access information of a physical apparatus such as GPS location information, and thereby can easily utilize a technology according to this disclosure without implementing a special function in the web browser.

Referring back to FIG. 16, after requesting the information on the GPS, the web browser can again send a request for information on a sensor to the in-device web proxy. At this time, the in-device web proxy can insert a name of a directory/HTML file corresponding to that of the sensor instead of GPS, and a response field to the name of the directory/HTML file, into the types of messages illustrated in FIG. 17 and FIG. 19. As a result, the in-device web proxy can enable the web browser to read the information on the sensor.

Figure 20:
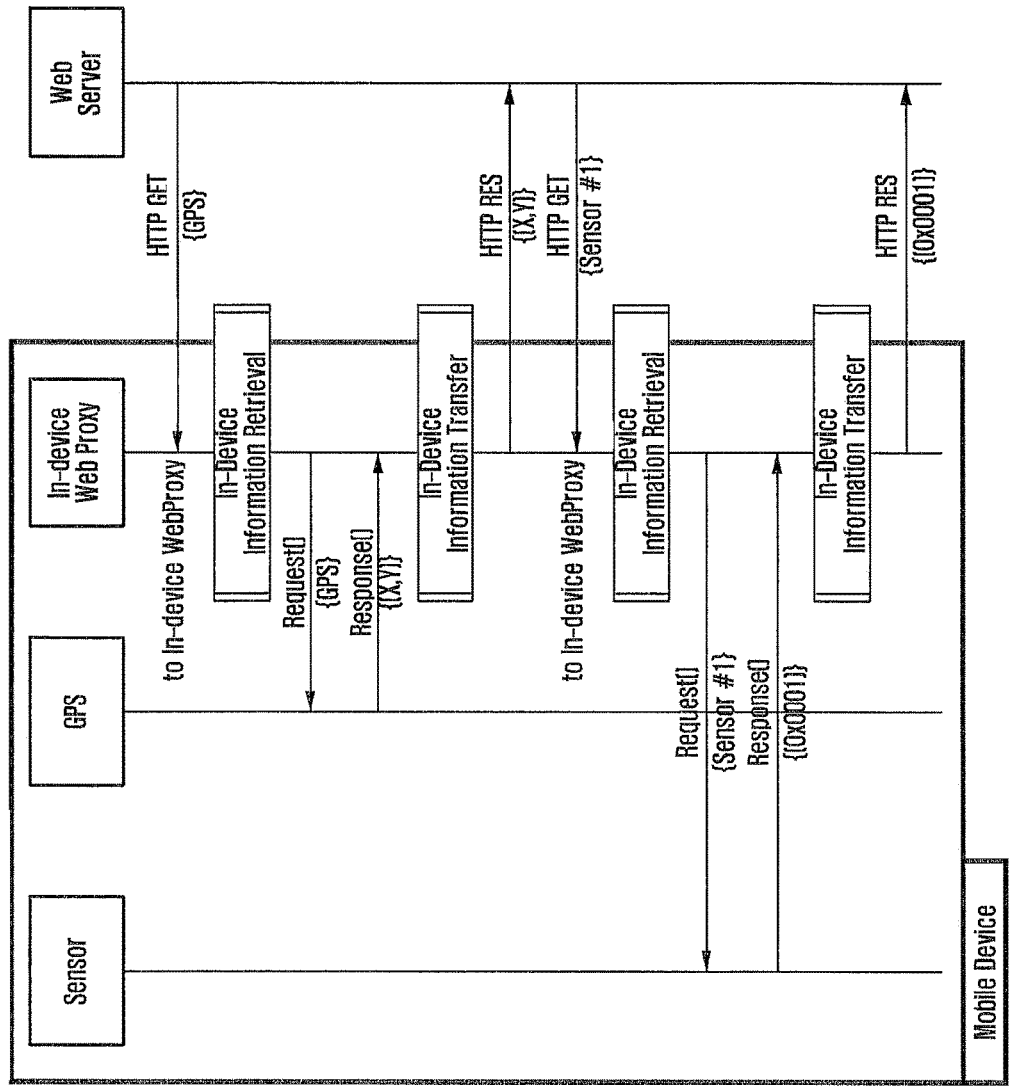
FIG. 20 is an example signal flow diagram illustrating a first embodiment in which a web server acquires information of a physical device through an in-device web proxy according to this disclosure.

A fourth embodiment of this disclosure, in which a mobile device accesses information of a physical apparatus, can be applied to not only a web browser within the mobile device, but also a web server located at a distance. Referring to FIG. 20, when requiring information on a physical apparatus of the mobile device, the web server located at a distance can transmit an HTTP REQ to an in-device web proxy of the mobile device. When the mobile device operates by using only the existing web browser according to the related art, the web server may not transmit an HTTP REQ to the mobile device. However, when the mobile device includes the in-device web proxy, the web server can perform HTTP-based connection to the mobile device in a distance place. At this time, the web server can assign a predefined port number for the in-device web proxy to a public IP address of the mobile device, and connect to the mobile device by using the predefined port number. Accordingly, even the web server located at a distance can acquire state information of the mobile device.

Figure 21:
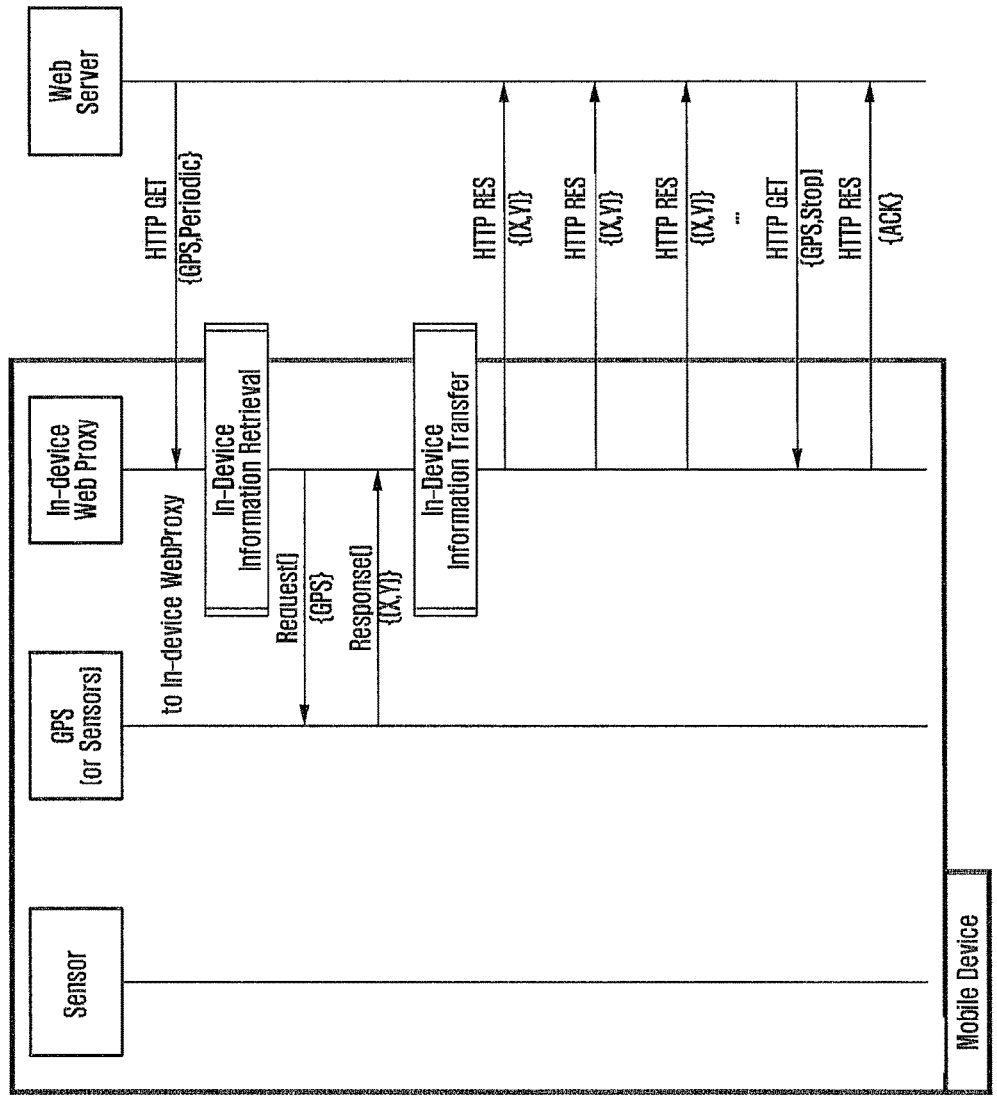
FIG. 21 is an example signal flow diagram illustrating a method in which a web server periodically acquires information of a physical device through an in-device web proxy according to this disclosure.

In an embodiment of the present disclosure, a web server or a web browser can periodically acquire state information of a physical apparatus of a mobile device, as illustrated in FIG. 21.

Figure 22:
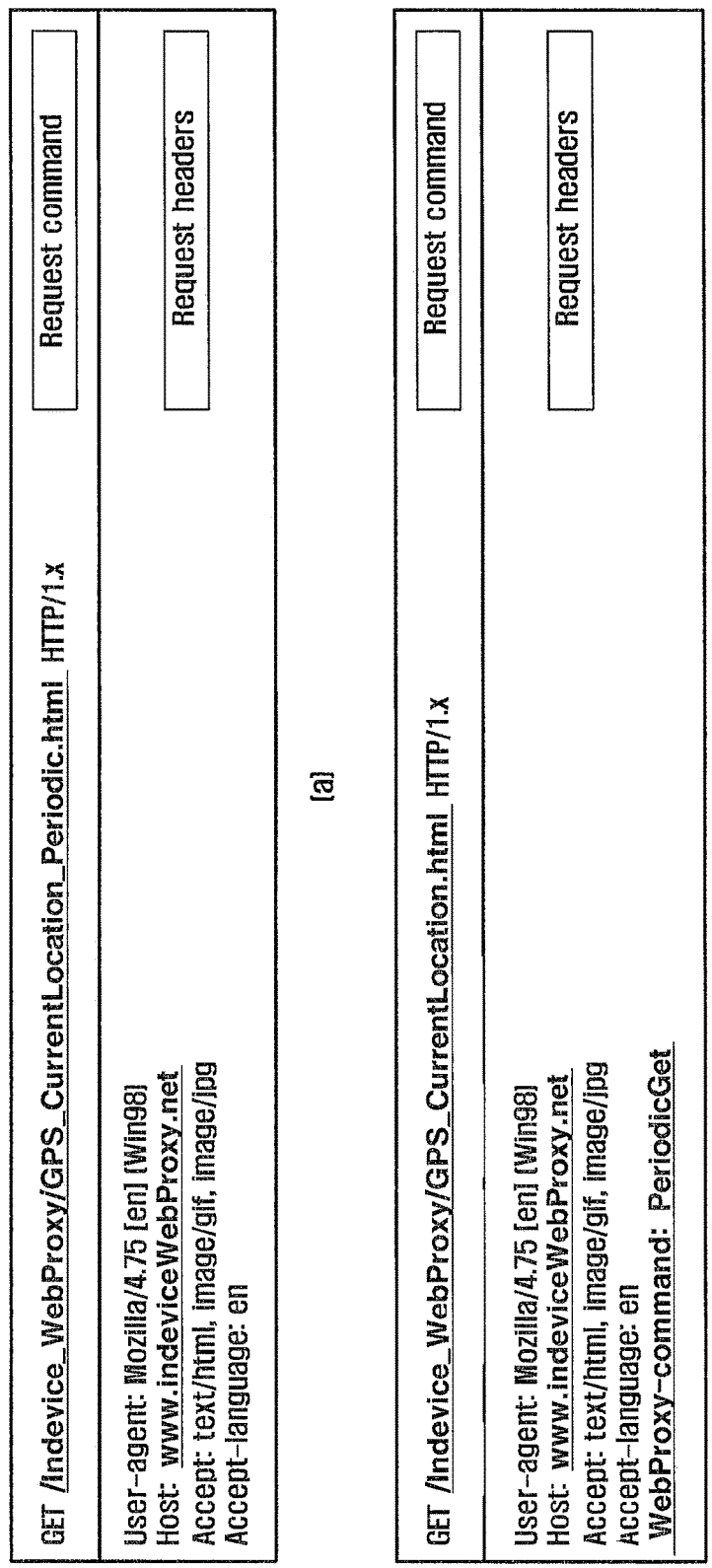
FIG. 22 is a view illustrating an example of an HTTP GET message for periodic information acquisition according to this disclosure.

In this case illustrated in FIG. 21, the web server or the web browser can transmit, to an in-device web proxy, an HTTP REQ message (or an HTTP GET message) illustrated in FIG. 22. The HTTP REQ message for periodic information acquisition can include a command such as "Periodic" in a file name, as illustrated in (a) of FIG. 22. Alternatively, an HTTP GET message for periodic information acquisition can use a file name identical to an HTTP REQ message for aperiodic information acquisition, as illustrated in (b) of FIG. 22, and can include a field named "WebProxy-command" as an additional field for a periodic transmission request.

According to the above-described embodiments of the present disclosure, an internet service provider can also receive, in real time, reported location movement information of the mobile device by using a web protocol.

Figure 23:
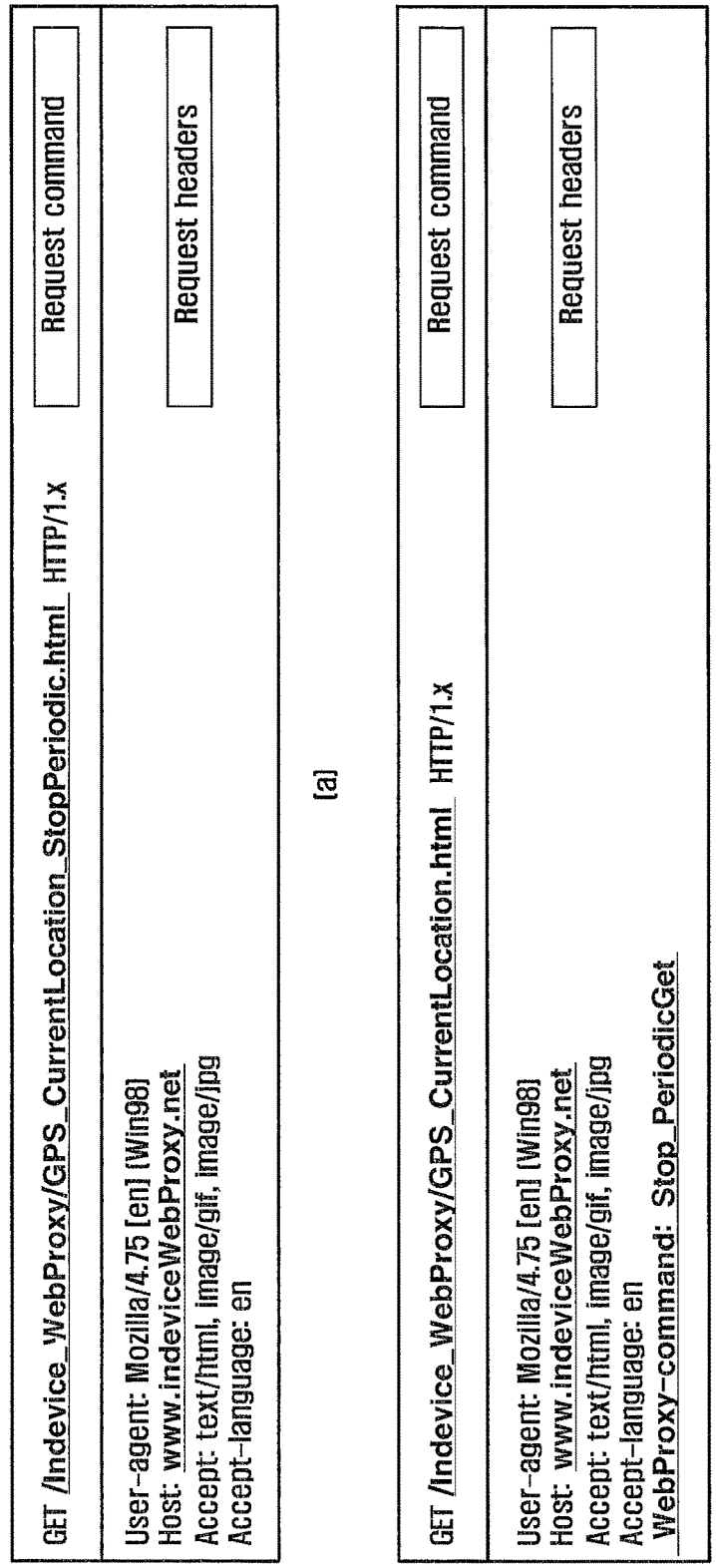
FIG. 23 is a view illustrating an example of an HTTP GET message for stopping periodic information acquisition according to this disclosure.
Figure 24:
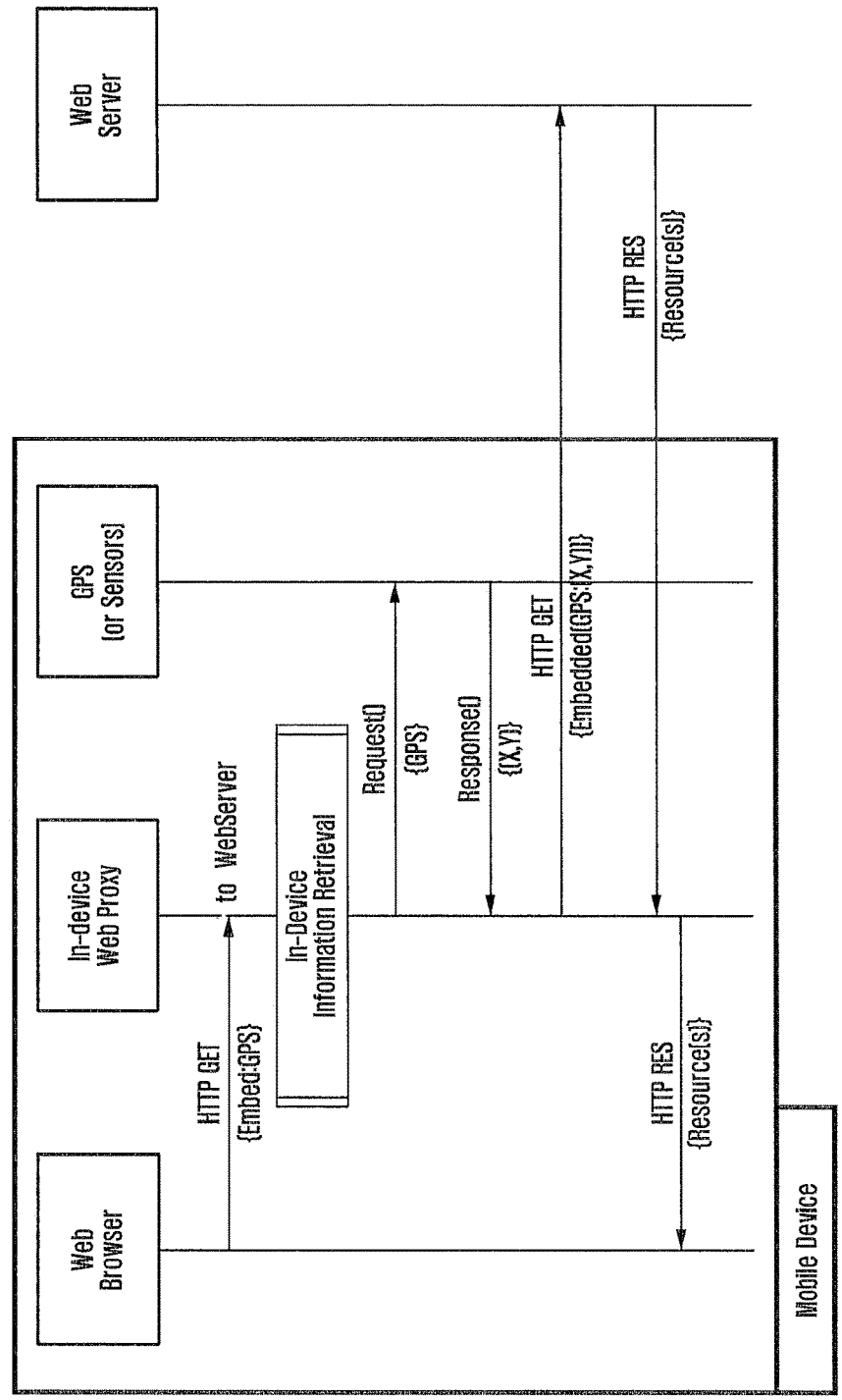
FIG. 24 is an example signal flow diagram illustrating a second embodiment in which a web server acquires information of a physical device through an in-device web proxy according to this disclosure.

When the web server or the web browser desires to stop periodic information acquisition, the web server or the web browser can transmit a message illustrated in FIG. 23 to the in-device web proxy. A message for stopping periodic information acquisition can include a command matched to a stop request in a name of an html file, as illustrated in (a) of FIG. 23. Alternatively, the message for stopping periodic information acquisition can include a field named "WebProxy-command" as an additional field, as illustrated in (b) of FIG. 23. In addition, referring to FIG. 24, a web browser can deliver a location of a mobile device to a web server. While transmitting an HTTP REQ to the in-device web proxy, the web browser can request the in-device web proxy to include GPS location information in the HTTP REQ when the in-device web proxy transmits the HTTP REQ to the web server. Accordingly, after reading location information of the mobile device from a GPS apparatus, the in-device web proxy can insert an HTML field indicating the GPS location information of the mobile device into an HTTP REQ message transmitted by the web browser, and can deliver the HTTP REQ message including the HTML field to the web server. When receiving the HTTP REQ message including the HTML field, the web server can provide content, that the web browser of the mobile device has requested, in view of the received location information of the mobile device.

In embodiments of the present disclosure, GPS information and sensor information have been proposed as an example of pieces of physical information of the mobile device. However, it is possible to read and deliver, in a similar method, various types of pieces of information, such as apparatus information, subscriber information, and the like within the mobile device.

Sharing content between mobile devices based on web protocol is provided.

Figure 25:
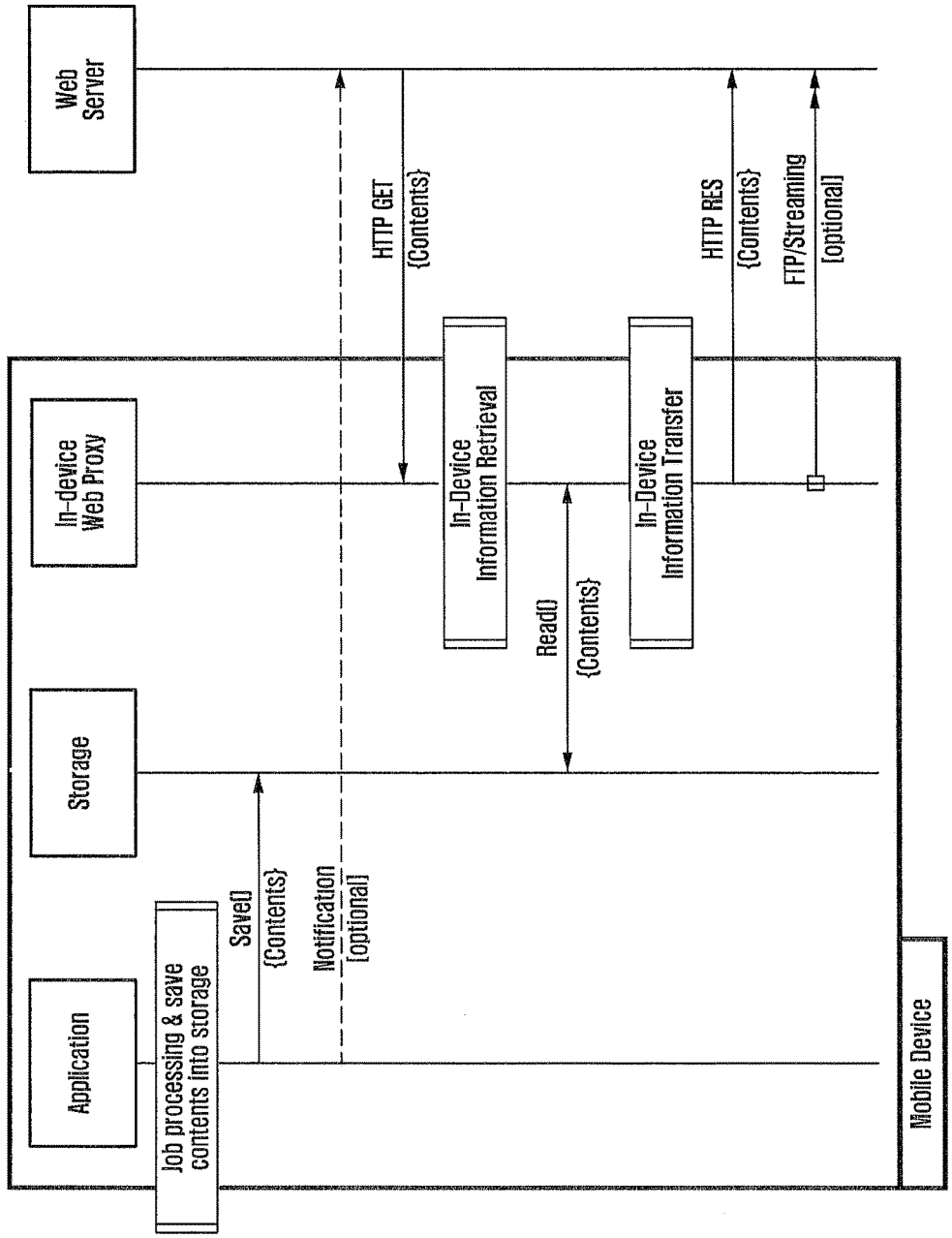
FIG. 25 is an example signal flow diagram illustrating a method for controlling a connection to a web server in a mobile device according to a fourth embodiment of this disclosure.

FIG. 25 is an example signal flow diagram illustrating a method for controlling a connection to a web server in a mobile device according to at least a fourth embodiment of this disclosure. Referring to FIG. 25, after completing its own task, an application program of the mobile device can store a result of the task in a storage space of the mobile device. Examples of the task can be related to various cases, such as a moving image obtained by directly capturing and editing images by the mobile device, environmental information obtained by collecting and processing images by the mobile device, operation state information of the mobile device, state information of a vehicle which performs communication via the mobile device, and the like. After completion of storing the result of the task, the application program of the mobile device can notify a web server located at a distance of the relevant fact (such as the completion of storing the result of the task). At this time, the application program can transmit the relevant fact together with a command instructing the web server to bring the relevant stored data from the mobile device when the necessity arises.

In this case, it is not required to transmit all pieces of content produced by the mobile device to the web server as in the past, even content required to be transmitted to the web server may not need to be transmitted in real time, and the web server can send a request for content to the mobile device when the web server requires the content. Accordingly, the web server can transmit an HTTP GET to an in-device web proxy of the mobile device at a time point when the web server requires the content. At this time, the HTTP GET can include information (such as a name) on a storage space for storing content that the application program of the mobile device has generated as an address value. The information on the storage space can be acquired from a notification message transmitted by the in-device web proxy. The in-device web proxy can read content, that the HTTP GET has requested, from the storage space, and can deliver the requested content to the web server through an HTTP RES or FTP/streaming.

Figure 26:
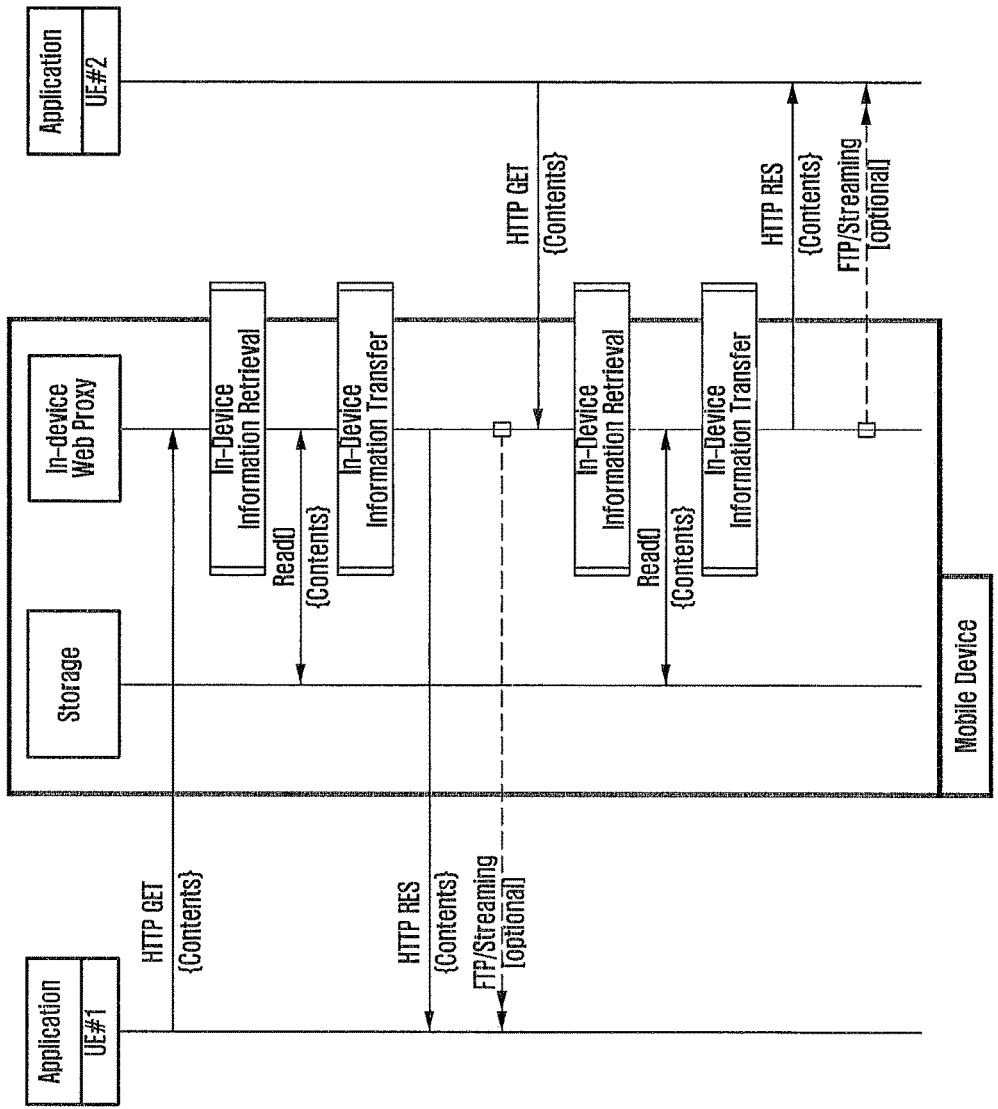
FIG. 26 is an example signal flow diagram illustrating a method for sharing content between mobile devices according to this disclosure.

FIG. 26 is an example signal flow diagram illustrating a method for sharing content between mobile devices according to this disclosure. Specifically, FIG. 26 illustrates the method for sharing content of an in-device web proxy between the external devices which use a mobile device as a hub.

An application program of UE#1 and an application program of UE#2 can access the content of the in-device web proxy, and can consume the content independently of each other.

Figure 27:
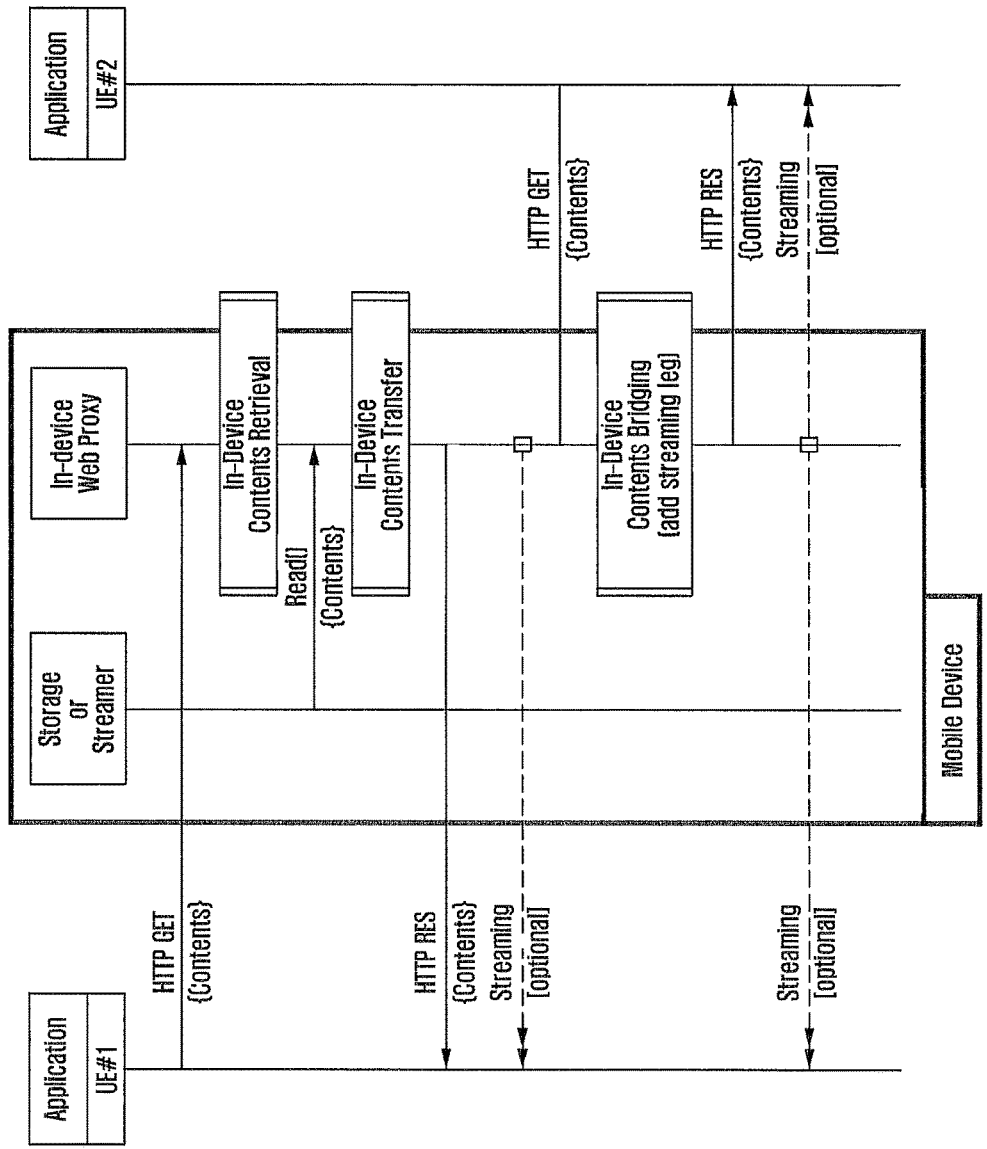
FIG. 27 is an example signal flow diagram illustrating a method for sharing content between mobile devices according to this disclosure.

When the mobile device has real-time content and is capable of transmitting the real-time content to the UEs which use the relevant mobile device as a hub, a scenario illustrated in FIG. 27 can be implemented. First, when the application program of UE#1 requests the real-time content, the in-device web proxy can deliver the real-time content to the application program of UE#1. Next, when the application program of UE#2 also requests the real-time content, the in-device web proxy can simultaneously deliver the real-time content to the application program of UE#1 and the application program of UE#2, and thus the real-time content can also be viewed through UE#1.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method for controlling a connection of a mobile device to a web server by an in-device web proxy, the method comprising:
transmitting, by an in-device web proxy within a network bridge included in the mobile device, a connection request to the web server based on the connection request for connecting to the web server, the connection request being generated by a first web browser running on a first Operating System (OS) in the mobile device;
caching, by the in-device web proxy within the network bridge included in the mobile device, information included in a connection response based on the connection response received from the web server in response to the connection request, wherein the information includes an identifier of a neighboring device communicating with the web server through the mobile device;
sharing, by the in-device web proxy within the network bridge included in the mobile device, the cached information corresponding to a new connection request with a second web browser running on a second OS in the mobile device, the second OS being different from the first OS based on the new connection request for connecting to the web server, the new connection request being generated by the second web browser;
receiving, from the web server, a hypertext transfer protocol (HTTP) message which requests information on at least one physical apparatus included in the mobile device, wherein at least one physical apparatus comprises a global positioning system (GPS), or a sensor;
acquiring the information on the at least one physical apparatus; and
transmitting, to the web server, the information on the at least one physical apparatus.

2. The method of claim 1, wherein the information comprises cookie information issued by the web server.

3. The method of claim 2, wherein caching the information comprises:
determining whether previously-cached cookie information exists for the web server; and
updating, based on the determination that the previously-cached cookie information exists, the previously-cached cookie information based on the information included in the connection response.

4. The method of claim 2, wherein caching the information comprises caching at least one of an identifier of the web server, and an identification of a user.

5. The method of claim 2, further comprising, transmitting, to the first web browser or the second web browser, the connection response received from the web server.

6. The method of claim 1, wherein transmitting the connection request comprises:
compressing the connection request; and
transmitting the compressed connection request to the web server.

7. The method of claim 1, wherein sharing the cached information comprises:
determining whether information identical to the cached information has been requested, based on the new connection request; and
sharing the cached information with the second web browser, based on the information identical to the cached information being requested.

8. The method of claim 1, further comprising:
receiving a HTTP message which requests the information on at the least one physical apparatus included in the mobile device from the first web browser or the second web browser;
acquiring the information on the physical apparatus through the first OS or the second OS; and
transmitting the acquired information on the physical apparatus to the first web browser or the second web browser through an HTTP message.

9. The method of claim 1, further comprising:
storing data generated by an application of the mobile device;
transmitting information on the data to the web server; and
transmitting the data to the web server based on a request for transmitting the data received from the web server.

10. A mobile device including an in-device web proxy, the mobile device comprising:
a transceiver configured to communicate with a web server;
a storage unit;
a network bridge including the in-device web proxy; and
a controller configured to:
control to transmit, by the in-device web proxy within the network bridge, a connection request to the web server, based on the connection request for connecting to the web server, the connection request being generated by a first web browser running on a first Operating System (OS) in the mobile device, cache, by the in-device web proxy within the network bridge, information included in a connection response based on the connection response received from the web server in response to the connection request, wherein the information includes an identifier of a neighboring device communicating with the web server through the mobile device, share, by the in-device web proxy within the network bridge, the cached information corresponding to a new connection request with a second web browser running on a second OS in the mobile device, the second OS being different from the first OS, based on the new connection request for connecting to the web server, the new connection request being generated by the second web browser, receive, from the web server, a hypertext transfer protocol (HTTP) message which requests information on at least one physical apparatus included in the mobile device, wherein at least one physical apparatus comprises a global positioning system (GPS), or a sensor, acquire the information on the at least one physical apparatus, and transmit, to the web server, the information on the at least one physical apparatus.

11. The mobile device of claim 10, wherein the information comprises cookie information issued by the web server.

12. The mobile device of claim 11, wherein the controller is configured to determine whether previously-cached cookie information exists for the web server, and update, based on the determination that the previously-cached cookie information exists, the previously-cached cookie information based on the information included in the connection response.

13. The mobile device of claim 11, wherein the controller is configured to cache, in the storage unit, at least one of an identifier of the web server, and an identification of a user.

14. The mobile device of claim 11, wherein the controller is configured to control to transmit, to the first web browser or the second web browser, the connection response received from the web server.

15. The mobile device of claim 10, wherein the controller is configured to compress the connection request, and control to transmit the compressed connection request to the web server.

16. The mobile device of claim 10, wherein the controller is configured to determine, based on the new connection request, whether information identical to the cached information has been requested, and share the cached information with the second web browser based on the information identical to the cached information being requested.

17. The mobile device of claim 10, wherein the mobile device further comprises at least one physical apparatus configured to sense a state of the mobile device, wherein, when the first web browser or the second web browser is configured to generate a HTTP message which requests the information on the at least one physical apparatus, the controller is configured to acquire the information on the physical apparatus through the first OS or the second OS, and transmit the acquired information on the physical apparatus to the first web browser or the second web browser through an HTTP message.

18. The mobile device of claim 10, wherein the controller is configured to store data generated by an application of the mobile device in the storage unit, control to transmit information on the data to the web server, and control to transmit the data to the web server based on a request for transmitting the data received from the web server.

* * * * *